United States Patent
Chen et al.

(10) Patent No.: US 10,209,487 B2
(45) Date of Patent: *Feb. 19, 2019

(54) OPTICAL IMAGING SYSTEM

(71) Applicant: LARGAN PRECISION CO., LTD., Taichung (TW)

(72) Inventors: Chun-Shan Chen, Taichung (TW); Tsung-Han Tsai, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 44 days.

This patent is subject to a terminal disclaimer.

(21) Appl. No.: 15/468,079

(22) Filed: Mar. 23, 2017

(65) Prior Publication Data

US 2017/0192208 A1 Jul. 6, 2017

Related U.S. Application Data

(63) Continuation of application No. 14/746,475, filed on Jun. 22, 2015, now Pat. No. 9,645,356, which is a (Continued)

(30) Foreign Application Priority Data

Nov. 19, 2010 (TW) .............................. 099140051 A

(51) Int. Cl.
*G02B 9/60* (2006.01)
*G02B 13/18* (2006.01)
(Continued)

(52) U.S. Cl.
CPC .......... *G02B 13/0045* (2013.01); *G02B 5/208* (2013.01); *G02B 9/60* (2013.01); *G02B 13/002* (2013.01); *G02B 13/18* (2013.01)

(58) Field of Classification Search
CPC .. G02B 13/0045; G02B 13/002; G02B 13/04; G02B 13/18; G02B 9/60; G02B 5/208
(Continued)

(56) References Cited

U.S. PATENT DOCUMENTS 4,491,394 A   1/1985  Matsubara
5,251,069 A   10/1993 Iizuka
(Continued)

FOREIGN PATENT DOCUMENTS

CN   101421658 A   4/2009
JP   S57-195212 A   11/1982
(Continued)

*Primary Examiner* — Marin Pichler
(74) *Attorney, Agent, or Firm* — Maschoff Brennan

(57) ABSTRACT

An optical imaging system includes, in order from an object side to an image side, a first lens element with positive refractive power, a second lens element, a third lens element, a fourth lens element, and a fifth lens element. Each of the fourth lens element and the fifth lens element includes at least one aspheric surface. The fourth lens element and the fifth lens element are made of plastic. The fifth lens element includes a concave image-side surface and at least one inflection point. An axial distance is formed between each of the first lens element, the second lens element, the third lens element, the fourth lens element, and the fifth lens element, and the optical imaging system further comprises a stop.

29 Claims, 16 Drawing Sheets

Related U.S. Application Data continuation of application No. 14/096,750, filed on Dec. 4, 2013, now Pat. No. 9,128,276, which is a continuation of application No. 13/091,817, filed on Apr. 21, 2011, now Pat. No. 8,687,293.

(51) Int. Cl.
*G02B 5/20* (2006.01)
*G02B 13/00* (2006.01)

(58) Field of Classification Search
USPC .................................. 359/714, 763, 764, 767
See application file for complete search history.

(56) References Cited

U.S. PATENT DOCUMENTS

| | | | |
|---|---|---|---|
| 5,850,312 A | 12/1998 | Kato et al. | |
| 7,365,920 B2 | 4/2008 | Noda | |
| 7,443,610 B1 | 10/2008 | Lin et al. | |
| 7,710,665 B2 | 5/2010 | Park et al. | |
| 7,880,981 B2 | 2/2011 | Do | |
| 7,965,454 B2 | 6/2011 | Tanaka et al. | |
| 8,072,695 B1 | 12/2011 | Lee et al. | |
| 2009/0122423 A1* | 5/2009 | Park | G02B 9/34 359/764 |
| 2010/0053776 A1* | 3/2010 | Tanaka | G02B 9/60 359/793 |
| 2010/0091387 A1 | 4/2010 | Hirao et al. | |
| 2010/0220229 A1 | 9/2010 | Sano | |
| 2010/0284094 A1 | 11/2010 | Chen et al. | |
| 2012/0087019 A1 | 4/2012 | Tang et al. | |

FOREIGN PATENT DOCUMENTS

| | | |
|---|---|---|
| JP | H02-146014 A | 6/1990 |
| JP | H07-120677 A | 5/1995 |
| JP | H11-326789 A | 11/1999 |
| JP | 2000-066095 A | 3/2000 |
| JP | 2004-069777 A | 3/2004 |
| JP | 2008-281760 A | 11/2008 |
| JP | 2010-008562 | 1/2010 |
| JP | 2010-026434 | 2/2010 |
| JP | 2010-079296 | 4/2010 |

* cited by examiner

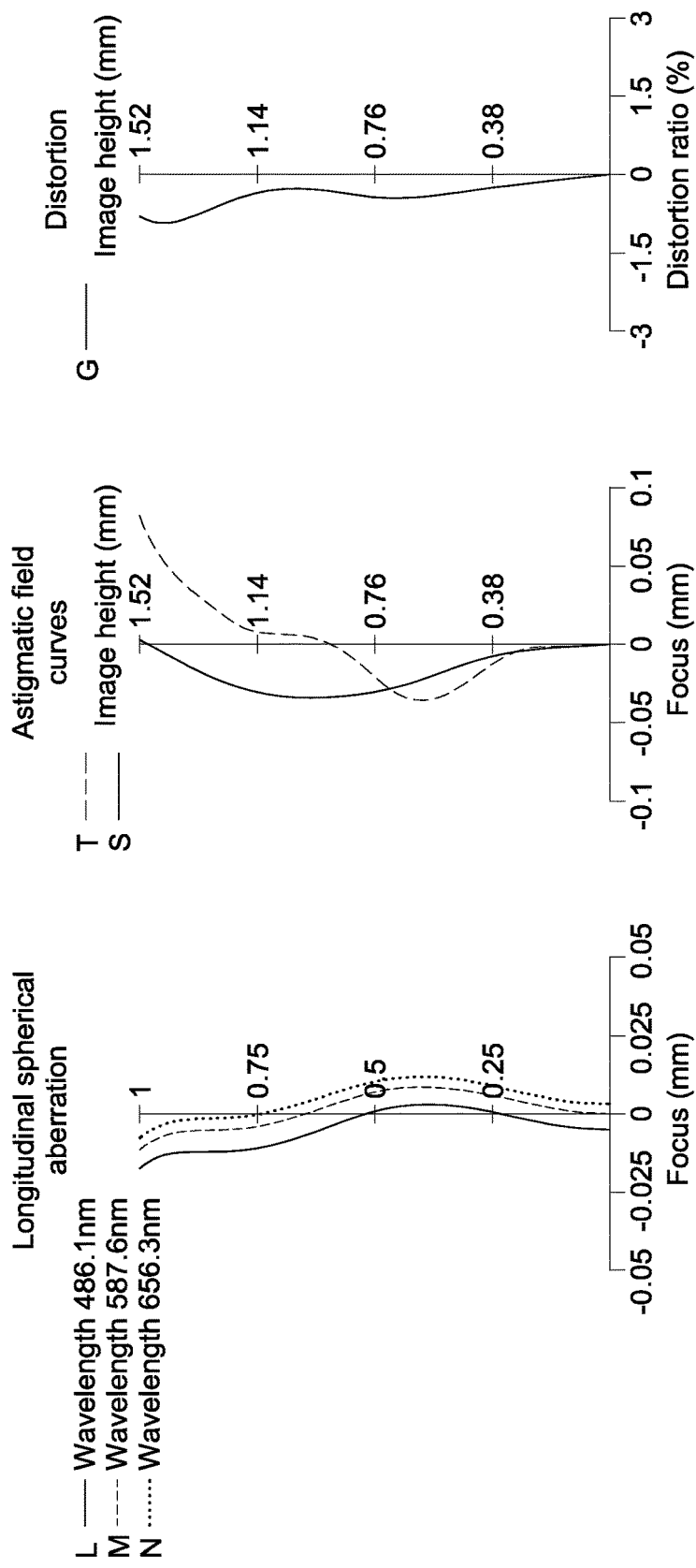

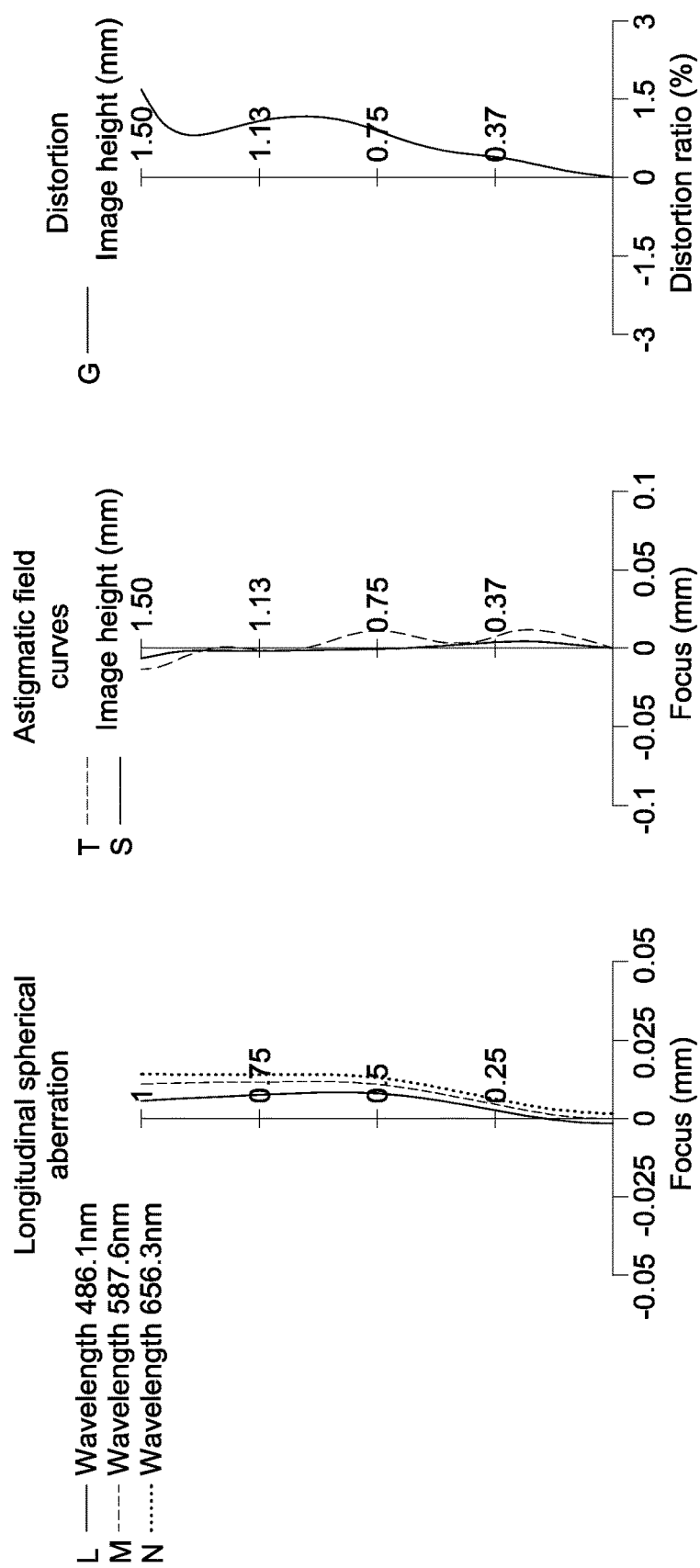

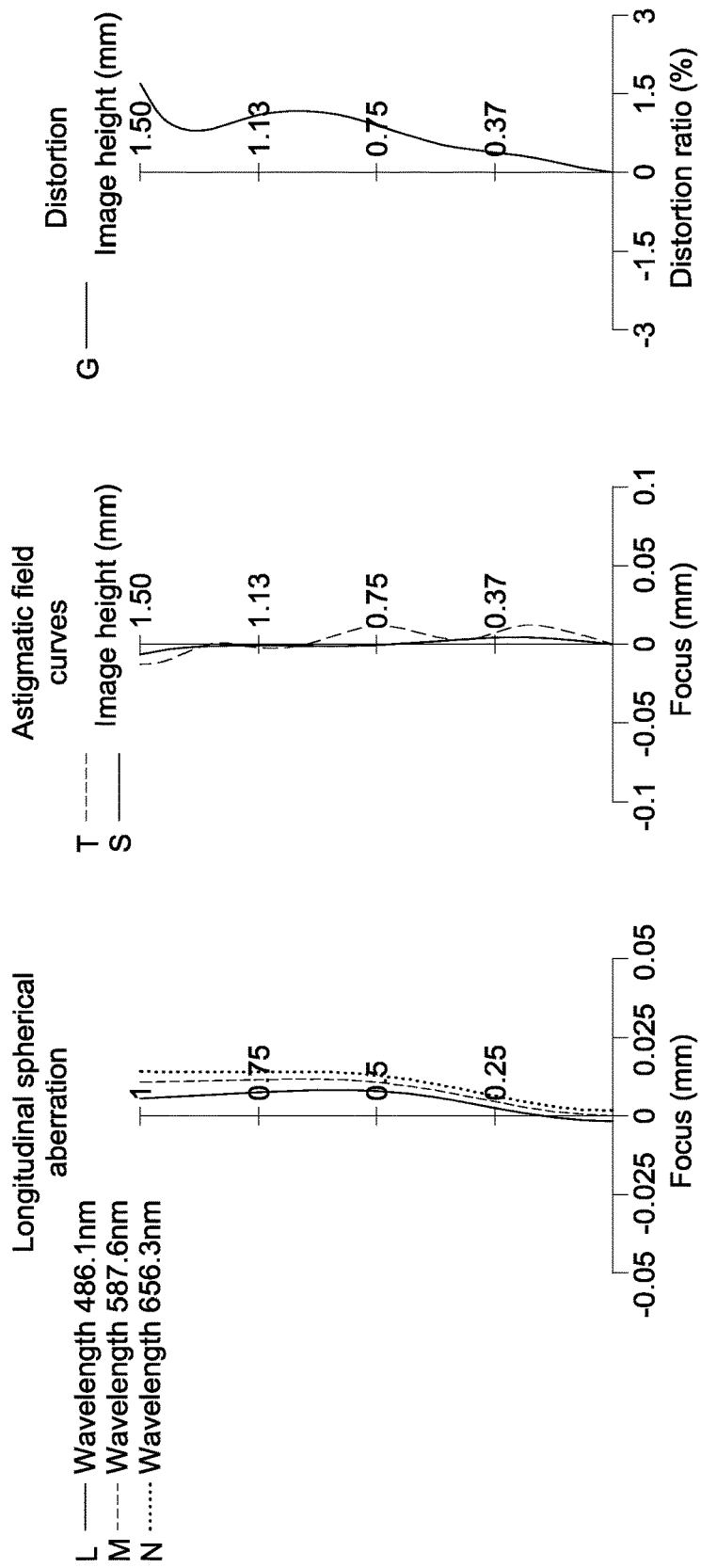

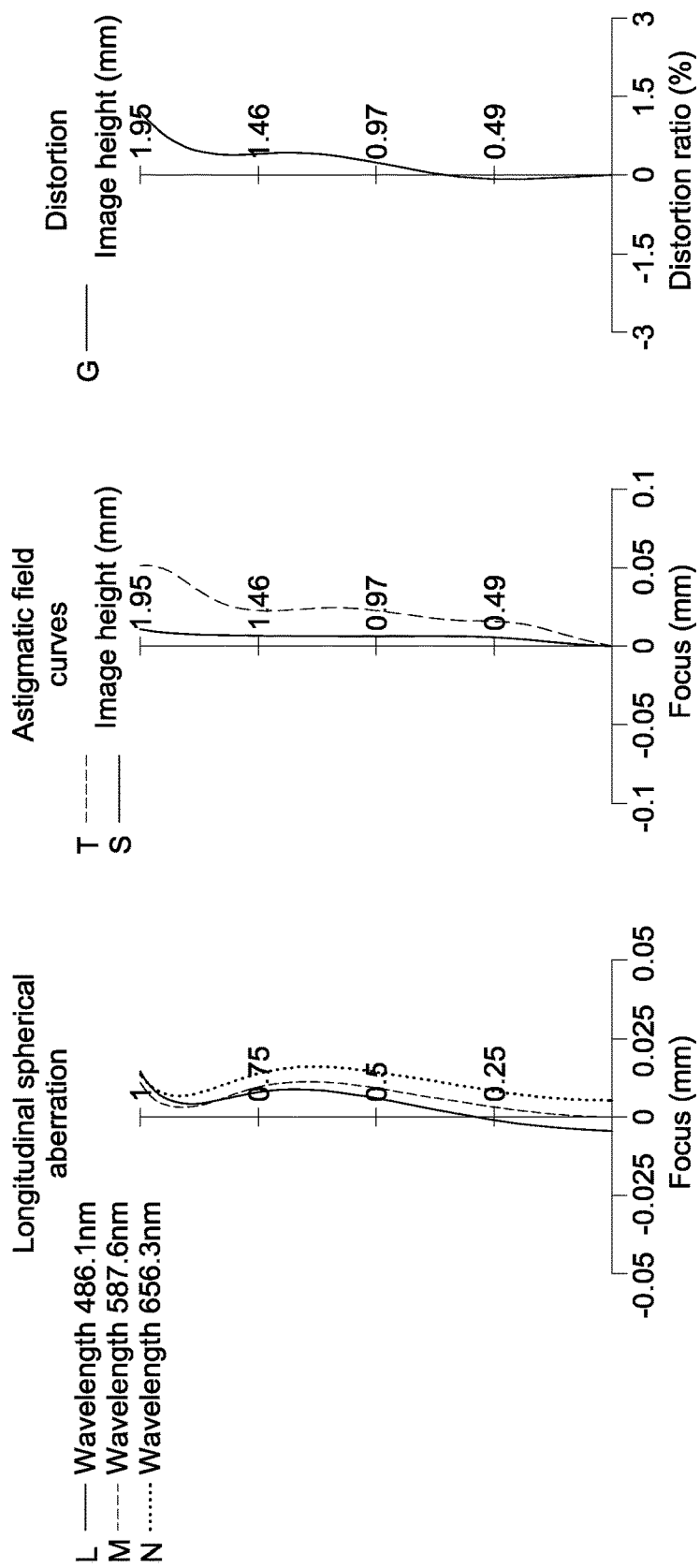

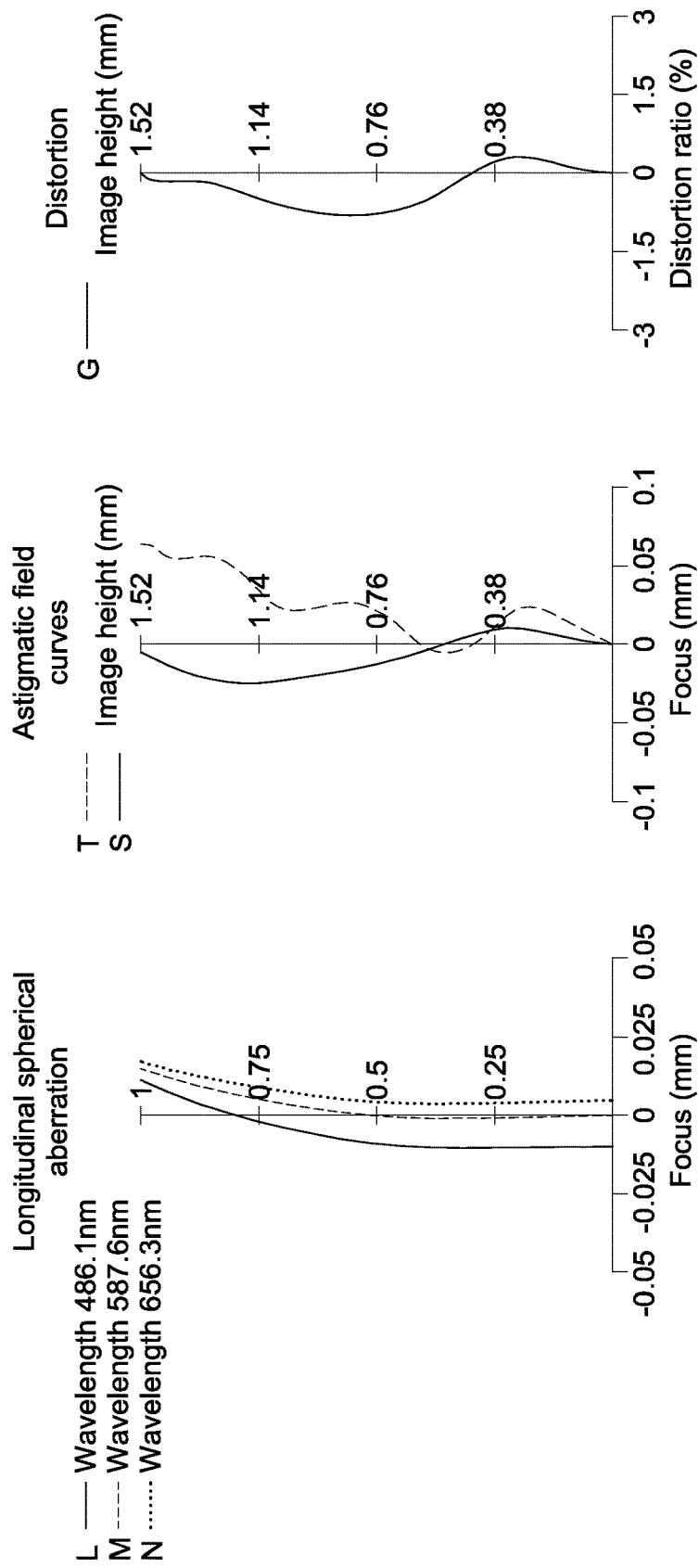

OPTICAL IMAGING SYSTEM

CROSS-REFERENCE TO RELATED APPLICATIONS

This application is a continuation application of U.S. patent application Ser. No. 14/746,475, filed Jun. 22, 2015, entitled "OPTICAL IMAGING SYSTEM", by Chun-Shan CHEN, Tsung-Han TSAI and Hsin-Hsuan HUANG, which is a continuation application of U.S. patent application Ser. No. 14/096,750, filed Dec. 4, 2013, entitled "OPTICAL IMAGING SYSTEM", by Chun-Shan CHEN, Tsung-Han TSAI and Hsin-Hsuan HUANG, which is a continuation application of U.S. patent application Ser. No. 13/091,817, filed Apr. 21, 2011, entitled "OPTICAL IMAGING SYSTEM", by Chun-Shan CHEN, Tsung-Han TSAI and Hsin-Hsuan HUANG, which claims priority under 35 U.S.C. § 119(a) on Patent Application No(s). 099140051 filed in Taiwan, R.O.C. on Nov. 19, 2010, all of which are hereby incorporated herein in its entirety by reference.

BACKGROUND OF THE INVENTION

Field of Invention

The present invention relates to an optical imaging system, and more particularly to an optical imaging system having multiple lens elements.

Related Prior Art

In recent years, with the rise of mobile electronics featuring camera functionalities, the demand for miniaturized camera lenses is boosted exponentially. Photo-sensing device (sensor) of ordinary photographing camera is commonly selected from charge coupled device (CCD) or complementary metal-oxide semiconductor (CMOS). In addition, as advanced semiconductor manufacturing technology enables the minimization of pixel size of sensors, the development of the miniaturized camera lenses is also heading toward the high pixel domain. Therefore, the standards for the imaging quality are rapidly raised.

U.S. Pat. No. 7,365,920 provides a miniature camera unit with a four-element lens assembly. The lens elements of the miniaturized camera are utilized in various portable electronics. However, due to the popularity of the mobile electronics such as smart phones and personal digital assistants (PDAs), the standards for the resolution and the imaging quality of the miniature camera lens assemblies have been raised, accordingly. The conventional four-element lens assembly cannot meet the requirement of the higher order camera lens module. Besides, the electronic products are continuously developed towards the trend of lightweight and high performance. Therefore, an optical imaging system capable of improving the imaging quality of mobile electronics as well as minimizing the overall size of the camera lens assembly equipped therewith is urgently needed.

SUMMARY OF THE INVENTION

In response to the trend of development of miniature electronics and to solve the aforementioned problems, the present invention provides an optical imaging system designed for compact portable electronics and capable of improving the imaging quality of the optical imaging system.

According to an embodiment of the present invention, an optical imaging system comprises, in order from an object side to an image side, a first lens element with positive refractive power comprises an object-side surface, a second lens element, a third lens element, a fourth lens element, and a fifth lens element. The fourth lens element comprises an object-side surface and an image-side surface, at least one of the object-side surface and the image-side surface of the fourth lens element is aspheric, and the fourth lens element is made of plastic. The fifth lens element comprises an object-side and a concave image-side surface, the image-side surface of the fifth lens element comprises at least one inflection point, and at least one of the object-side surface and the image-side surface of the fifth lens element is aspheric, and the fifth lens element is made of plastic. An axial distance is formed between each of the first lens element, the second lens element, the third lens element, the fourth lens element, and the fifth lens element, and the optical imaging system further comprises a stop, Td is an axial distance from the object-side surface of the first lens element to the image-side surface of the fifth lens element, SL is an axial distance from the stop to an image plane, TTL is an axial distance from the object-side surface of the first lens element to the image plane, and the optical imaging system satisfies the following conditions:

$$2.00 \text{ mm} < Td < 3.00 \text{ mm} \quad \text{(Condition 1):}$$

$$0.65 < SL/TTL < 1.10 \quad \text{(Condition 2):}$$

According to another embodiment of the present invention, an optical imaging system comprises, in order from an object side to an image side, a first lens element comprising an object-side surface, a second lens element having positive refractive power, a third lens element, a fourth lens element, and a fifth lens element. The fourth lens element comprises an object-side surface and an image-side surface, at least one of the object-side surface and the image-side surface of the fourth lens element is aspheric, and the fourth lens element is made of plastic. The fifth lens element comprises an object-side and a concave image-side surface, the image-side surface of the fifth lens element comprises at least one inflection point, and at least one of the object-side surface and the image-side surface of the fifth lens element is aspheric, and the fifth lens element is made of plastic, and the fifth lens element is made of plastic. The optical imaging system further comprises a stop, Td is an axial distance from the object-side surface of the first lens element to the image-side surface of the fifth lens element, SL is an axial distance from the stop to an image plane, TTL is an axial distance from the object-side surface of the first lens element to the image plane, and the optical imaging system satisfies the following conditions:

$$2.00 \text{ mm} < Td < 3.00 \text{ mm} \quad \text{(Condition 1):}$$

$$0.65 < SL/TTL < 1.10 \quad \text{(Condition 2):}$$

According to another embodiment of the present invention, an optical imaging system comprises, in order from an object side to an image side, a first lens element having positive refractive power, a second lens element, a third lens element, a fourth lens element, and a fifth lens element. The first lens element comprises an object-side surface and an image-side surface, at least one of the object-side surface and the image-side surface of the first lens element is aspheric. The second lens element comprises an object-side surface and an image-side surface, at least one of the object-side surface and the image-side surface of the second lens element is aspheric. The third lens element comprises an object-side surface and an image-side surface, at least one of the object-side surface and the image-side surface of the third lens element is aspheric. The fourth lens element comprises an object-side surface and an image-side surface, at least one of the object-side surface and the image-side surface of the fourth lens element is aspheric, and the fourth lens element is made of plastic. The fifth lens element comprises an object-side and a concave image-side surface, the image-side surface of the fifth lens element comprises at least one inflection point, and at least one of the object-side surface and the image-side surface of the fifth lens element is aspheric, and the fifth lens element is made of plastic, and the fifth lens element is made of plastic. An axial distance is formed between each of the first lens element, the second lens element, the third lens element, the fourth lens element, and the fifth lens element, and the optical imaging system further comprises a stop, Td is an axial distance from the object-side surface of the first lens element to the image-side surface of the fifth lens element, SL is an axial distance from the stop to an image plane, TTL is an axial distance from the object-side surface of the first lens element to the image plane, and the optical imaging system satisfies the following conditions:

$0.65<SL/TTL<1.10$ (Condition 2):

$Td<3.00$ mm (Condition 3):

According to another embodiment of the present invention, an optical imaging system comprises, in order from an object side to an image side, a first lens element, a second lens element having positive refractive power, a third lens element, a fourth lens element, and a fifth lens element. The first lens element comprises an object-side surface and an image-side surface, at least one of the object-side surface and the image-side surface of the first lens element is aspheric. The second lens element comprises an object-side surface and an image-side surface, at least one of the object-side surface and the image-side surface of the second lens element is aspheric. The third lens element comprises an object-side surface and an image-side surface, at least one of the object-side surface and the image-side surface of the third lens element is aspheric. The fourth lens element comprises an object-side surface and an image-side surface, at least one of the object-side surface and the image-side surface of the fourth lens element is aspheric, and the fourth lens element is made of plastic. The fifth lens element comprises an object-side and an image-side surface. The image-side surface of the fifth lens element comprises at least one inflection point, and at least one of the object-side surface and the image-side surface of the fifth lens element is aspheric, and the fifth lens element is made of plastic The optical imaging system further comprises a stop, Td is an axial distance from the object-side surface of the first lens element to the image-side surface of the fifth lens element, SL is an axial distance from the stop to an image plane, TTL is an axial distance from the object-side surface of the first lens element to the image plane, and the optical imaging system satisfies the following conditions:

$0.65<SL/TTL<1.10$ (Condition 2):

$Td<3.00$ mm (Condition 3):

When the optical imaging system satisfies Condition 1 or Condition 3 can miniaturize the optical imaging system. Therefore, the optical imaging system is suitable for lightweight, slim, and portable electronics.

When the result of SL/TTL is close to 1.10, an exit pupil of the optical imaging system is away from the image plane. The angle of incidence with incoming light projecting onto the sensor would be close to perpendicular and a telecentric characteristic of the image-side would be more pronounced. Therefore, when an electronic sensor is disposed on the image plane, the photo-sensing capability of the electronic sensor is improved and the shading occurrences will be minimized. Having SL/TTL close to 0.65 can widen the view angle and can correct both distortion and chromatic aberration of magnification. In addition, the sensitivity of the optical imaging system is effectively reduced.

BRIEF DESCRIPTION OF THE DRAWINGS

The present invention will become more fully understood from the following detailed description when taken in connection with the accompanying drawings, which show, for the purpose of illustrations only, and thus do not limit other possible applications derived from the spirit of the present invention, and wherein:

FIG. 1B is a schematic view of longitudinal spherical aberration curves when the lights having wavelengths of 486.1 nm, 587.6 nm, and 656.3 nm are respectively projected in the optical imaging system in FIG. 1A;

FIG. 1C is a schematic view of astigmatic field curves when the light having the wavelength of 587.6 nm is projected in the optical imaging system in FIG. 1A;

FIG. 1D is a schematic view of a distortion curve when the light having the wavelength of 587.6 nm is projected in the optical imaging system in FIG. 1A;

FIG. 4B is a schematic view of longitudinal spherical aberration curves when the lights having wavelengths of 486.1 nm, 587.6 nm, and 656.3 nm are respectively projected in the optical imaging system in FIG. 4A;

FIG. 4C is a schematic view of astigmatic field curves when the light having the wavelength of 587.6 nm is projected in the optical imaging system in FIG. 4A;

FIG. 4D is a schematic view of a distortion curve when the light having the wavelength of 587.6 nm is projected in the optical imaging system in FIG. 4A;

FIG. 5B is a schematic view of longitudinal spherical aberration curves when the lights having wavelengths of 486.1 nm, 587.6 nm, and 656.3 nm are respectively projected in the optical imaging system in FIG. 5A;

FIG. 5C is a schematic view of astigmatic field curves when the light having the wavelength of 587.6 nm is projected in the optical imaging system in FIG. 5A;

FIG. 5D is a schematic view of a distortion curve when the light having the wavelength of 587.6 nm is projected in the optical imaging system in FIG. 5A;

FIG. 7B is a schematic view of longitudinal spherical aberration curves when the lights having wavelengths of 486.1 nm, 587.6 nm, and 656.3 nm are respectively projected in the optical imaging system in FIG. 7A;

FIG. 7C is a schematic view of astigmatic field curves when the light having the wavelength of 587.6 nm is projected in the optical imaging system in FIG. 7A;

FIG. 7D is a schematic view of a distortion curve when the light having the wavelength of 587.6 nm is projected in the optical imaging system in FIG. 7A;

FIG. 8B is a schematic view of longitudinal spherical aberration curves when the lights having wavelengths of 486.1 nm, 587.6 nm, and 656.3 nm are respectively projected in the optical imaging system in FIG. 8A;

FIG. 8C is a schematic view of astigmatic field curves when the light having the wavelength of 587.6 nm is projected in the optical imaging system in FIG. 8A; and FIG. 8D is a schematic view of a distortion curve when the light having the wavelength of 587.6 nm is projected in the optical imaging system in FIG. 8A.

DETAILED DESCRIPTION OF THE INVENTION

The optical imaging system of the present invention is described with FIG. 1A as an example, to illustrate that the embodiments have similar lens combination and configuration relationship, and to illustrate that the embodiments have the same conditions of the optical imaging system, and the differences are described in details in the following embodiments.

Figure 1A:
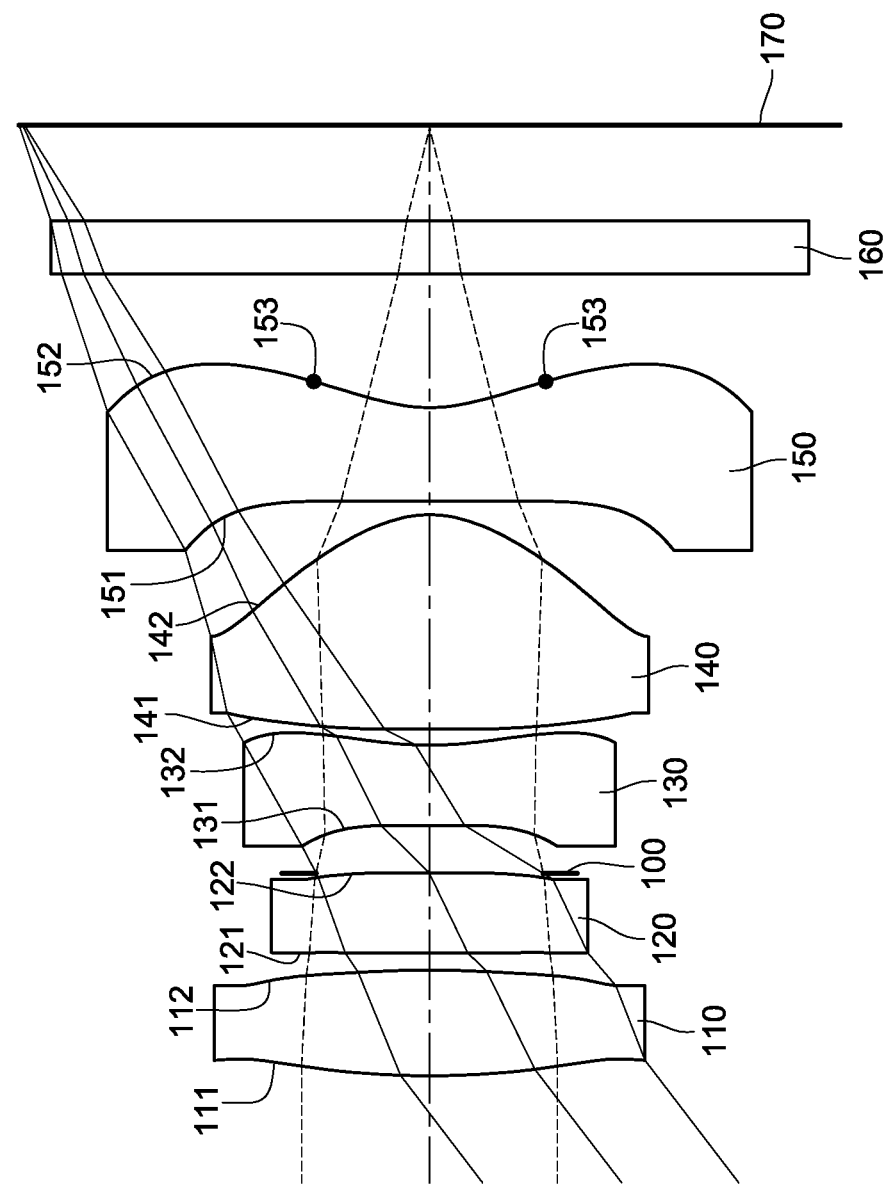
FIG. 1A is a schematic structural view of a first embodiment of an optical imaging system according to the present invention.

Taking FIG. 1A as an example, the optical imaging system 10 comprises, from an object side to an image side along an optical axis (from left to right in FIG. 1A) in sequence, a first lens element 110, a second lens element 120, a third lens element 130, a fourth lens element 140, and a fifth lens element 150.

Additionally, the optical imaging system 10 further comprises a stop 100 and an image plane 170 disposed therein. An electronic sensor (not shown) may be disposed on the image plane 170 for imaging by the optical imaging system 10.

The first lens element 110 comprises an object-side surface 111 and an image-side surface 112. The first lens element 110 with positive refractive power may provide partial refractive power needed by the optical imaging system 10 and reduce the total optical length. Moreover, the object-side surface 111 of the first lens element 110 can be a convex surface to enhance the positive refractive power of the first lens element 110 and to further reduce the total length of the optical imaging system.

The second lens element 120 comprises an object-side surface 121 and an image-side surface 122. The second lens element 120 with positive refractive power may enhance the positive refractive power configuration.

The third lens element 130 comprises an object-side surface 131 and an image-side surface 132. The third lens element 130 with negative refractive power may favorably correct the aberration and the chromatic aberration of the optical imaging system 10 at the same time. Furthermore, the image-side surface 132 of the third lens element 130 may be a concave surface to enhance the negative refractive power of the third lens element 130, so as to correct the aberration of the optical imaging system 10. The third lens element 130 may include at least one inflection point for reducing the angle of incidence on the electronic sensor (not shown) from the off-axis field.

The fourth lens element 140 comprises an object-side surface 141 and an image-side surface 142. Furthermore, at least one of the object-side surface 141 of the fourth lens element 140 and the image-side surface 142 of the fourth lens element 140 is aspheric. Moreover, the image-side surface 142 of the second lens element 140 may be a convex surface for enhancing the positive refractive power of the fourth lens element 140 and further reducing the total optical length.

The fifth lens element 150 comprises an object-side surface 151 and a concave image-side surface 152. The fourth lens element 140 with positive refractive power forms a telephoto lens with the fifth lens element 150 with negative refractive power, in order to reduce the total optical length and miniaturize the optical imaging system 10. In addition, at least one of the object-side surface 151 and the image-side surface 152 of the fifth lens element 150 is aspheric. Moreover, the object-side surface 151 of the fifth lens element 150 may be convex near the optical axis, and the concave image-side surface 152 of the fifth lens element 150 can reduce the total optical length by increasing the distance from a principal point of the optical imaging system 10 to the image plane 170. Accordingly, the optical imaging system 10 becomes more compact. The fifth lens element 150 may include at least one inflection point for correcting the off-axis aberration.

Furthermore, the fourth lens element 140 and the fifth lens element 150 can be plastic lens elements. Hence, the manufacturing cost and the weight of the optical imaging system 10 are reduced and it is beneficial to the manufacturing of the aspheric surface lens.

The optical imaging system 10 of the present invention satisfies the following relation:

$$2.00 \text{ mm} < Td < 3.00 \text{ mm} \quad \text{(Condition 1):}$$

$$0.65 < SL/TTL < 1.10 \quad \text{(Condition 2):}$$

$$Td < 3.00 \text{ mm} \quad \text{(Condition 3):}$$

Td is an axial distance from the object-side surface 111 of the first lens element 110 to the image-side surface 152 of the fifth lens element 150, SL is a distance from the aperture stop 100 to the image plane 170, TTL is a distance from the object-side surface 111 of the first lens element 110 to an image plane 170.

When the optical imaging system 10 satisfies Condition 1 or Condition 3 can miniaturize the optical imaging system 10. Therefore, the optical imaging system 10 is suitable for lightweight, slim, and portable electronics. In some embodiments, the optical imaging system 10 further satisfies a stricter condition: 2.20 mm<Td<2.80 mm.

When the optical imaging system 10 satisfies Condition 2, the position of the aperture stop 100 is close to the third lens element 130. The view angle can be increased, and both the distortion and the chromatic aberration of magnification can be corrected. Additionally, the sensitivity of the optical imaging system 10 is effectively reduced. In some embodiments, the optical imaging system 10 further satisfies a stricter condition: 0.65<SL/TTL<1.10 or 0.90<SL/TTL<1.10.

Moreover, the optical imaging system 10 of the present invention may further satisfy at least one of the following conditions:

$$0 < v_1 - (v_2 + v_3) < 25 \quad \text{(Condition 4):}$$

$$0.1 < R_{10}/f < 0.5 \quad \text{(Condition 5):}$$

$$0.77 < (\Sigma CT)/Td < 0.95 \quad \text{(Condition 6):}$$

$$29 < v_1 - v_3 < 45 \quad \text{(Condition 7):}$$

$$0.20 < CT_3/CT_4 < 0.55 \quad \text{(Condition 8):}$$

$v_1$ is an Abbe number of the first lens element 110, $v_2$ is an Abbe number of the second lens element 120, and $v_3$ is an Abbe number of the third lens element 130, f is an overall focal length of the optical imaging system 10, $R_{10}$ is a radius of curvature of the image-side surface 152 of the fifth lens element 150, ($\Sigma CT$) is a sum of axial thicknesses of the first lens element 110, the second lens element 120, the third lens element 130, the fourth lens element 140, and the fifth lens element 150, Td is a distance from the object-side surface 111 of the first lens element 110 to the image-side surface 152 of the fifth lens element 150 on the optical axis, $CT_3$ is an axial thickness of the third lens element 130, and $CT_4$ is an axial thickness of the fourth lens element 140.

When the optical imaging system 10 of the present invention satisfies Condition 4, it can correct the chromatic aberration of the optical imaging system 10. When the optical imaging system 10 of the present invention satisfies Condition 5, the principal point of the system is away from the image plane 170, and thus the total length of the system is further reduced. The optical imaging system 10 of the present invention satisfying Condition 6 can reduce the total optical length and miniaturize the optical imaging system 10. The optical imaging system 10 of the present invention satisfying Condition 7 can correct the chromatic aberration of the optical imaging system 10. When the optical imaging system 10 of the present invention satisfies Condition 8, the third lens element 130 and the fourth lens element 140 have appropriate thickness, respectively for easier lens assembling process.

In the optical imaging system 10 of the present invention, all the lens elements (that is, the first lens element 110, the second lens element 120, the third lens element 130, the fourth lens element 140, and the fifth lens element 150) may be made of glass or plastic. If the lens element is made of glass, there is more freedom in distributing the refractive power for the optical imaging system 10. If a lens element of the present invention is made of plastic, the production cost is effectively reduced. In addition, the surfaces of lens elements can be aspheric and easily made into non-spherical profiles, allowing more design parameter freedom which can be used to reduce aberrations and total number of the lens elements, so that the total optical length of the assembly can be reduced effectively.

In the optical imaging system 10 of the present invention, a convex surface means the surface is a convex surface at a paraxial site. A concave surface means the surface is a concave surface at a paraxial site. In addition, at least one aperture stop (such as flare stops, field stops, or other types of stops) may be disposed within the optical imaging system 10 if necessary to eliminate the stray light, to adjust the field of view, or to provide other improvements concerning the image quality.

As for the optical imaging system 10 of the present invention, the specific schemes are further described with the following embodiments. Parameters in the embodiments are defined as follows. Fno is an f-number value of the optical imaging system, and HFOV is a half of a maximal viewing angle in the optical imaging system. The aspheric surface in the embodiments may be represented by, but not limited to, the following aspheric surface equation (Condition ASP):

$$X(Y) = (Y^2/R)/(1 + sqrt(1-(1+k)*(Y/R)^2)) + \sum_i (Ai)*(Y^i)$$

Wherein,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, and 14.

The First Embodiment (Embodiment 1)

FIG. 1A is a schematic structural view of a first embodiment of an optical imaging system according to the present invention. As shown in FIG. 1A, the optical imaging system 10 comprises, in order from an object side to an image side (from left to right in FIG. 1A), a first lens element 110, a second lens element 120, an aperture stop 100, a third lens element 130, a fourth lens element 140, a fifth lens element 150, an infrared filter 160, and an image plane 170.

In this embodiment, for example, the wavelength of the light received by the optical imaging system 10 is 587.6 nm, but the wavelength of the light received by the optical imaging system 10 may be adjusted according to actual requirements, and is not limited to the wavelength value mentioned above.

Furthermore, the fourth lens element 140 and the fifth lens element 150 are aspheric, and the aspheric surfaces of the present invention may satisfy Condition ASP, but are not limited thereto. As for the parameters of the aspheric surfaces, reference is made to Table 1-1 below.

TABLE 1-1

| Aspheric Coefficients | | | | |
|---|---|---|---|---|
| Surface# | | | | |
| 1 | 2 | 3 | 4 | 6 |
| k | −3.49470E+00 | −2.82962E+01 | −3.59735E+01 | −1.76562E+00 | −1.12539E+01 |
| $A_4$ | 1.03455E−01 | 4.81685E−01 | 2.40597E−01 | −7.51792E−01 | −2.10166E+00 |
| $A_6$ | −4.78603E−01 | −1.69186E+00 | −3.45679E−01 | 5.64716E−01 | 1.21159E+00 |
| $A_8$ | 1.84374E+00 | 8.88196E−01 | −6.17117E+00 | 1.56747E+00 | 2.30522E+00 |
| $A_{10}$ | −4.60855E+00 | 1.03639E+00 | 1.65928E+01 | 3.30003E−01 | −1.57037E+00 |
| $A_{12}$ | 3.38619E+00 | −3.62165E−01 | 1.36511E+01 | −6.15946E+00 | −1.26029E+01 |
| $A_{14}$ | 4.65221E−02 | 1.16385E+00 | −4.59678E+01 | 1.82352E+01 | — |

| Surface# | | | | |
|---|---|---|---|---|
| 7 | 8 | 9 | 10 | 11 |
| k | −1.00000E+00 | −1.00000E+00 | −3.09374E+00 | 4.35938E+00 | −7.43623E+00 |
| $A_4$ | −1.14240E+00 | 3.90764E−01 | −6.05942E−01 | 2.82990E−01 | −2.28405E−01 |
| $A_6$ | 1.78473E+00 | −6.84571E−01 | 8.53946E−01 | −1.55944E+00 | 8.85041E−02 |
| $A_8$ | −2.13235E+00 | 5.35307E−02 | −6.20962E−01 | 2.16497E+00 | −3.31373E−02 |
| $A_{10}$ | −5.02921E−01 | 1.08376E+00 | −3.96314E−01 | −8.41198E−01 | −2.92041E−02 |
| $A_{12}$ | 1.00537E+00 | −8.66765E−01 | 1.85206E+00 | −1.49054E+00 | 1.64690E−02 |
| $A_{14}$ | — | 3.15569E−01 | −5.17182E−01 | 1.15973E+00 | −1.75257E−03 |

The image-side surface 152 of the fifth lens element 150 further comprises two inflection points 153 on the radial section of the fifth lens element 150 shown in FIG. 1A. This could control an angle at which the light of an off-axis field of view is projected onto an electronic sensor (not shown) of the image plane 170 and correct the aberration in the off-axis field of view. The detailed data of the optical imaging system 10 is as shown in Table 1-2 below.

TABLE 1-2

(Embodiment 1)
f = 2.01 mm, Fno = 2.10, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.37670 (ASP) | 0.395 | Plastic | 1.544 | 55.9 | 3.16 |
| 2 | | −3.36790 (ASP) | 0.064 | | | | |
| 3 | Lens 2 | −49.49600 (ASP) | 0.300 | Plastic | 1.634 | 23.8 | −52.00 |
| 4 | | 98.96120 (ASP) | −0.002 | | | | |
| 5 | Ape. Stop | Plano | 0.179 | | | | |
| 6 | Lens 3 | 8.33420 (ASP) | 0.300 | Plastic | 1.634 | 23.8 | −2.40 |
| 7 | | 1.26774 (ASP) | 0.059 | | | | |
| 8 | Lens 4 | 20.77260 (ASP) | 0.803 | Plastic | 1.544 | 55.9 | 0.77 |
| 9 | | −0.42378 (ASP) | 0.050 | | | | |
| 10 | Lens 5 | −49.51110 (ASP) | 0.350 | Plastic | 1.530 | 55.8 | −1.02 |
| 11 | | 0.54853 (ASP) | 0.500 | | | | |
| 12 | IR-filter | Plano | 0.200 | Glass | 1.517 | 64.2 | — |
| 13 | | Plano | 0.356 | | | | |
| 14 | Image | Plano | — | | | | |

Note:
Reference wavelength is d-line 587.6 nm

The content of Table 1-3 may be deduced from Table 1-2.

TABLE 1-3

| The First Embodiment | | | |
|---|---|---|---|
| f (mm) | 2.01 | $R_{10}/f$ | 0.27 |
| Fno | 2.10 | $CT_3/CT_4$ | 0.37 |
| HFOV (deg.) | 37.4 | $|f/f_4| + |f/f_5|$ | 4.58 |
| $v_1 - v_3$ | 32.1 | SL/TTL | 0.78 |
| $v_1 - (v_2 + v_3)$ | 8.3 | Td (mm) | 2.50 |
| $|R_1/R_2|$ | 1.00 | $(\Sigma CT)/Td$ | 0.86 |

In this embodiment, the $(\Sigma CT)/Td$ of the optical imaging system 10 is 0.86, which satisfies the range of Condition 1, 11, and 12, and indicates that the thicknesses of all the lens elements in the optical imaging system 10 is favorable and the total length of the optical imaging system 10 is effectively reduced, so as to miniaturizes the optical imaging system 10.

The SL/TTL of the optical imaging system 10 is 0.78, which satisfies Condition 2, can increase the viewing angle of the optical imaging system 10.

The Td of the optical imaging system 10 is 2.50 mm, which satisfies Condition 3 and 10, and miniaturizes the optical imaging system 10, so as that the optical imaging system 10 is suitable for light, thin and portable electronics.

The $|f/f_4|+|f/f_5|$ of the optical imaging system 10 is 4.58, which satisfies Condition 4. This prevents high order aberrations from increasing excessively.

The $R_{10}/f$ of the optical imaging system 10 is 0.27, which satisfies Condition 5, such that the principal point of the optical imaging system 10 can be far away from the image plane 170, so as to further reduce the total length of the optical imaging system 10.

The $v_1-v_3$ of the optical imaging system 10 is 32.1, which satisfies Condition 6, and corrects the chromatic aberration of the optical imaging system 10.

The $|R_1/R_2|$ of the optical imaging system 10 is 1.00, which satisfies Condition 7, and corrects the spherical aberration of the optical imaging system 10.

The $CT_3/CT_4$ of the optical imaging system 10 is 0.37, which satisfies Condition 8, and the thicknesses of the third lens element 130 and the fourth lens element 140 are suitable. Consequently, the optical imaging system 10 is adapted t for a simpler manufacturing process.

The $v_1-(v_2+v_3)$ of the optical imaging system 10 is 8.3, which satisfies Condition 9, and corrects the chromatic aberration of the optical imaging system 10.

FIG. 1B is a schematic view of longitudinal spherical aberration curves when the lights having wavelengths of 486.1 nm, 587.6 nm, and 656.3 nm are respectively projected in the optical imaging system in FIG. 1A. The longitudinal spherical aberration curve of the light having the wavelength of 486.1 nm in the optical imaging system 10 is indicated by a solid line L in FIG. 1B. The longitudinal spherical aberration curve of the light having the wavelength of 587.6 nm in the system is indicated by a dashed line M in FIG. 1B. The longitudinal spherical aberration curve of the light having the wavelength of 656.3 nm is indicated by a dotted line N in FIG. 1B. Horizontal axis is the focus position (millimeter, mm), and vertical axis is a normalized distance from the center of the entrance pupil or aperture stop toward its outermost boundary of aperture. In other words, the differences of the focus positions of the paraxial light (the longitudinal coordinate is close to 0) and the fringe light (the longitudinal coordinate is close to 1) after entering the optical imaging system 10 can be seen from the longitudinal spherical aberration curves, in which the paraxial light and the fringe light are parallel to the optical axis. It can be known from FIG. 1B that, when different wavelengths, 486.1 nm, 587.6 nm, or 656.3 nm, of the light are received by the optical imaging system 10 of this embodiment the longitudinal spherical aberrations generated by the optical imaging system 10 are within a range of −0.025 mm to 0.015 mm.

In the second embodiment to the eighth embodiment and the schematic views of the longitudinal spherical aberration curves in FIGS. 2B, 3B, 4B, 5B, 6B, 7B, and 8B, the solid line L indicates the longitudinal spherical aberration curve of the light having the wavelength of 486.1 nm, the dashed line M indicates the longitudinal spherical aberration curve of the light having the wavelength of 587.6 nm, and the dotted line N indicates the longitudinal spherical aberration curve of the light having the wavelength of 656.3 nm, which will not be repeated herein for conciseness.

FIG. 1C is a schematic view of astigmatic field curves when the light having the wavelength of 587.6 nm is projected in the optical imaging system in FIG. 1A. An astigmatic field curve of a tangential plane is a dashed line T in FIG. 1C. An astigmatic field curve of a sagittal plane is a solid line S in FIG. 1C. Horizontal axis is the focus position (mm), and vertical axis is the image height (mm). In other words, the differences of the focus positions due to different curvatures of the tangential plane and the sagittal plane can be seen from the astigmatic field curves. It can be known from FIG. 1C that, the astigmatic field curvature of the tangential plane generated when the light having the wavelength of 587.6 nm is projected in the optical imaging system 10 is within a range of −0.05 mm to 0.1 mm, and the astigmatic field curvature of the sagittal plane is within a range of −0.05 mm to 0.01 mm.

In the second embodiment to the eighth embodiment and the schematic views of the astigmatic field curves in FIGS. 2C, 3C, 4C, 5C, 6C, 7C, and 8C, the solid line S indicates the astigmatic field curve of the sagittal plane, and the dashed line T indicates the astigmatic field curve of the tangential plane, which will not be repeated herein for conciseness.

FIG. 1D is a schematic view of a distortion curve when the light having the wavelength of 587.6 nm is projected in the optical imaging system in FIG. 1A. The horizontal axis is distortion ratio (%), and the vertical axis is image height (mm). In other words, the differences of the distortion ratios caused by different image heights can be seen from the distortion curve G. It can be known from FIG. 1D that, the distortion ratio generated when the light having the wavelength of 587.6 nm is projected in the optical imaging system 10 is within a range of −1.5% to 0%. As shown in FIGS. 1B to 1D, the optical imaging system 10, designed according to the first embodiment, is capable of effectively eliminating various aberrations.

In the second embodiment to the eighth embodiment and the schematic views of the distortion curves in FIGS. 2D, 3D, 4D, 5D, 6D, 7D, and 8D, the solid line G indicates the distortion curve of the light having the wavelength of 587.6 nm, which will not be repeated herein for conciseness.

It should be noted that, the distortion curves and the astigmatic field curves generated when the lights having the wavelength of 486.1 nm and 656.3 nm are projected in the optical imaging system 10 are highly similar to the distortion curve and the astigmatic field curves generated when the light having the wavelength of 587.6 nm is projected in the optical imaging system 10. In order to prevent the confusion of reading the figures in FIGS. 1C and 1D, the distortion curve and the astigmatic field curves of wavelengths of 486.1 nm and 656.3 nm projected in the optical imaging system 10 are not shown in FIGS. 1C and 1D, and the same is throughout the rest of the embodiments of this present invention.

The Second Embodiment (Embodiment 2)

Figure 2A:
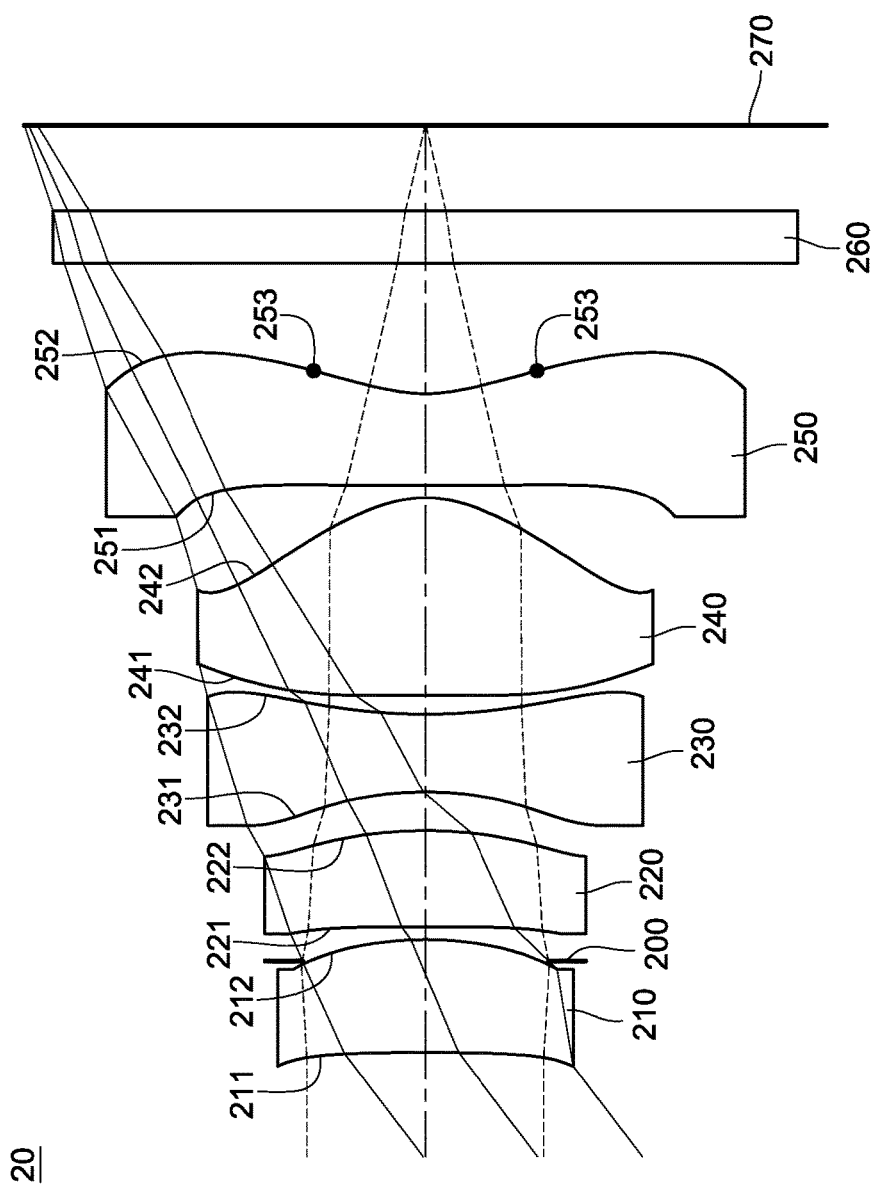
FIG. 2A is a schematic structural view of a second embodiment of the optical imaging system according to the present invention.

FIG. 2A is a schematic structural view of a second embodiment of the optical imaging system according to the present invention. The specific implementation and elements of the second embodiment are substantially the same as those in the first embodiment, wherein the element symbols all begin with "2", which correspond to those in the first embodiment with the same function or structure. For conciseness, only the differences among embodiments are illustrated below, and the similarities will not be repeated herein.

In this embodiment, for example, the wavelength of the light received by the optical imaging system 20 is 587.6 nm, but this wavelength may be adjusted according to actual requirements, and is not limited to the wavelength value mentioned above.

Furthermore, the fourth lens element 240 and the fifth lens element 250 are aspheric lens elements, and the aspheric surfaces may satisfy Condition ASP, but are not limited thereto. As for the parameters of the aspheric surfaces, reference is made to Table 2-1 below.

TABLE 2-1

Aspheric Coefficients

| | Surface# | | | | |
|---|---|---|---|---|---|
| | 1 | 2 | 4 | 5 | 6 |
| k | −5.00000E+01 | −5.34986E+00 | −5.00000E+01 | −1.09880E+01 | 5.24184E−01 |
| $A_4$ | −1.91529E−01 | −4.03081E−01 | −1.79998E−01 | −3.76491E−01 | −3.76322E−01 |
| $A_6$ | −8.15244E−01 | −5.30006E−01 | −7.34132E−01 | 3.42371E−01 | 8.84431E−01 |
| $A_8$ | 2.73073E+00 | 1.36908E−01 | −7.71084E−01 | 3.56200E−01 | 3.06673E+00 |
| $A_{10}$ | −7.46998E+00 | 7.79285E−01 | 4.79990E+00 | 1.87677E+00 | −5.57888E+00 |
| $A_{12}$ | 2.48640E−01 | 1.76724E−01 | 1.42202E+00 | 4.36357E−01 | 2.27643E+00 |
| $A_{14}$ | −7.37339E−01 | 7.10876E−02 | −7.15273E−01 | −1.65611E−01 | — |

| | Surface# | | | | |
|---|---|---|---|---|---|
| | 7 | 8 | 9 | 10 | 11 |
| k | −1.00000E+00 | −1.00000E+00 | −3.46151E+00 | −5.00000E+01 | −8.82032E+00 |
| $A_4$ | −1.11732E−01 | 4.43934E−01 | −4.23698E−01 | 2.18814E−01 | −2.37348E−01 |
| $A_6$ | 1.01081E−01 | −1.24042E−01 | 7.72757E−01 | −8.52171E−01 | 2.03710E−01 |
| $A_8$ | −5.38265E−02 | −5.52145E−01 | −3.73793E−01 | 1.09019E+00 | −1.25819E−01 |
| $A_{10}$ | −7.07412E−01 | 4.55300E−01 | 6.21951E−02 | −5.36250E−01 | 2.38755E−03 |
| $A_{12}$ | 4.51057E−01 | 3.65190E−01 | 4.35235E−01 | −2.83557E−01 | 1.65216E−02 |
| $A_{14}$ | — | −4.19036E−01 | −1.49994E−01 | 1.89310E−01 | −4.51254E−03 |

In this embodiment, the first lens element 210 has a positive refractive power, the third lens element 230 has a negative refractive power, the fourth lens element 240 has a positive refractive power, and the fifth lens element 250 has a negative refractive power. The image-side surface 232 of the third lens element 230 is a concave surface, the image-side surface 242 of the fourth lens element 240 is a convex surface, and the image-side surface 252 of the fifth lens element 250 is a concave surface.

Two inflection points 253 are on the image-side surface 252 of the fifth lens element 250. As a result, the incident angle of light projected onto the electronic sensor (not shown) of the image plane 270 from the off-axis field can be effectively reduced; thereby the aberration in the off-axis field of view is further corrected.

The detailed data of the optical imaging system 20 is as shown in Table 2-2 below.

TABLE 2-2

Embodiment 2
f = 2.02 mm, Fno = 2.20, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −17.00170(ASP) | 0.432 | Plastic | 1.544 | 55.9 | 2.86 |
| 2 | | −1.43684(ASP) | −0.080 | | | | |
| 3 | Ape. Stop | Plano | 0.130 | | | | |
| 4 | Lens 2 | −50.00000(ASP) | 0.367 | Plastic | 1.632 | 23.4 | 2.88 |
| 5 | | −1.76359(ASP) | 0.149 | | | | |
| 6 | Lens 3 | −1.41716(ASP) | 0.300 | Plastic | 1.632 | 23.4 | −1.31 |
| 7 | | 2.13907(ASP) | 0.071 | | | | |
| 8 | Lens 4 | −18.00320(ASP) | 0.757 | Plastic | 1.544 | 55.9 | 0.84 |
| 9 | | −0.45379(ASP) | 0.050 | | | | |
| 10 | Lens 5 | −50.00000(ASP) | 0.350 | Plastic | 1.530 | 55.8 | −1.11 |
| 11 | | 0.59539(ASP) | 0.500 | | | | |
| 12 | IR-filter | Plano | 0.200 | Glass | 1.517 | 64.2 | — |
| 13 | | Plano | 0.331 | | | | |
| 14 | Image | Plano | — | | | | |

Note:
The reference wavelength is d-line 587.6 nm

The content of Table 2-3 may be deduced from Table 2-2.

TABLE 2-3

| The Second Embodiment | | | |
|---|---|---|---|
| f (mm) | 2.02 | $R_{10}/f$ | 0.29 |
| Fno | 2.20 | $CT_3/CT_4$ | 0.40 |
| HFOV (deg.) | 37.3 | $|f/f_4| + |f/f_5|$ | 4.22 |
| $v_1 - v_3$ | 32.5 | SL/TTL | 0.90 |
| $v_1 - (v_2 + v_3)$ | 9.1 | Td (mm) | 2.53 |
| $|R_1/R_2|$ | 11.83 | $(\Sigma CT)/Td$ | 0.87 |

Figures 2B, 2C, 2D:
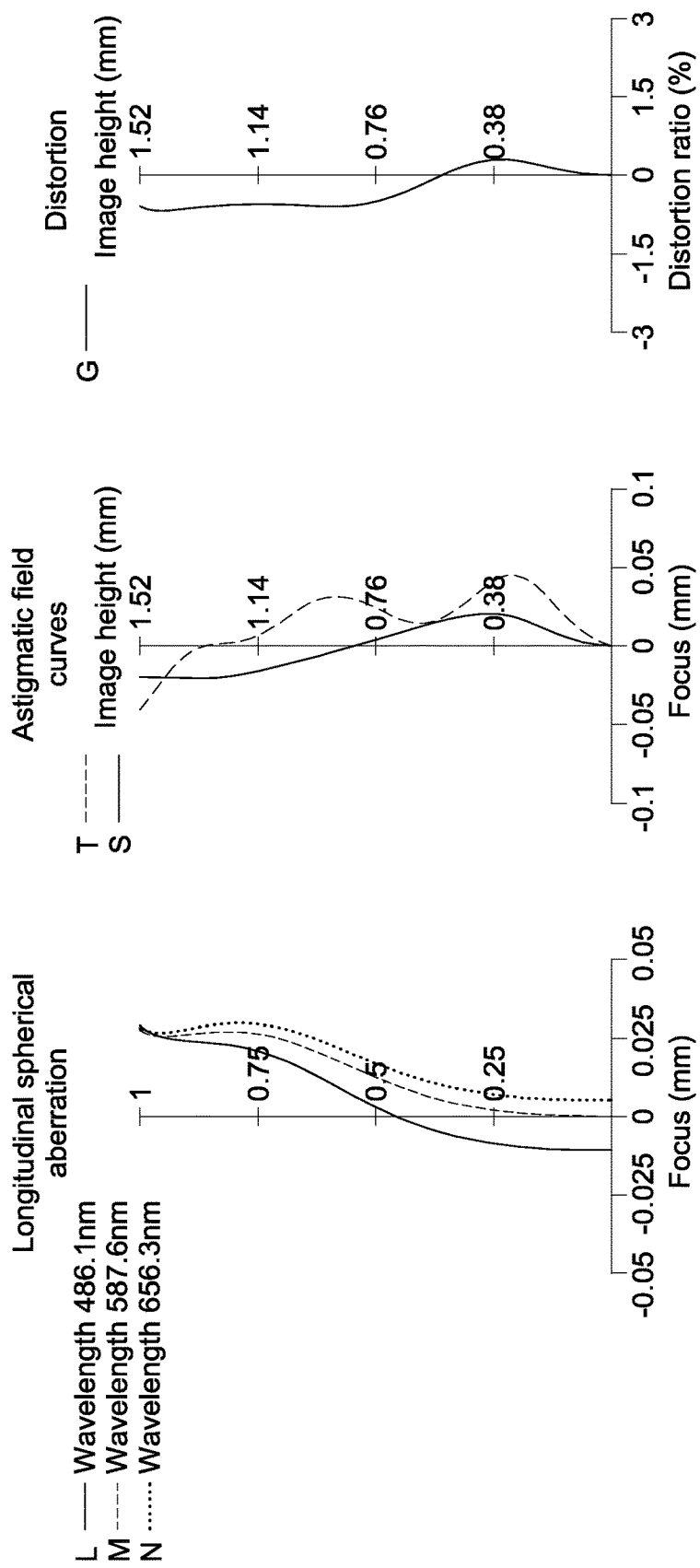
FIG. 2B is a schematic view of longitudinal spherical aberration curves when the lights having wavelengths of 486.1 nm, 587.6 nm, and 656.3 nm are respectively projected in the optical imaging system in FIG. 2A.
FIG. 2C is a schematic view of astigmatic field curves when the light having the wavelength of 587.6 nm is projected in the optical imaging system in FIG. 2A.
FIG. 2D is a schematic view of a distortion curve when the light having the wavelength of 587.6 nm is projected in the optical imaging system in FIG. 2A.

FIG. 2B is a schematic view of longitudinal spherical aberration curves when the lights having wavelengths of 486.1 nm, 587.6 nm, and 656.3 nm are respectively projected in the optical imaging system in FIG. 2A. It can be known from FIG. 2B that, when the different wavelengths, 486.1 nm, 587.6 nm, and 656.3 nm, of the light are received by the optical imaging system 20 of this embodiment, the longitudinal spherical aberrations generated by the optical imaging system 20 are within a range of −0.025 mm to 0.04 mm.

FIG. 2C is a schematic view of astigmatic field curves when the light having the wavelength of 587.6 nm is projected in the optical imaging system in FIG. 2A. It can be known from FIG. 2C that, the astigmatic field curvature of the tangential plane generated when the light having the wavelength of 587.6 nm is projected in the optical imaging system 20 is within a range of −0.05 mm to 0.05 mm, and the astigmatic field curvature of the sagittal plane is within a range of −0.03 mm to 0.03 mm.

FIG. 2D is a schematic view of a distortion curve when the light having the wavelength of 587.6 nm is projected in the optical imaging system in FIG. 2A. It can be known from FIG. 2D that, the distortion ratio generated when the light having the wavelength of 587.6 nm is projected in the optical imaging system 20 is within a range of −0.5% to 0.5%. As shown in FIGS. 2B to 2D, the optical imaging system 20, designed according to the second embodiment, is capable of effectively correcting various aberrations.

The Third Embodiment (Embodiment 3)

Figure 3A:
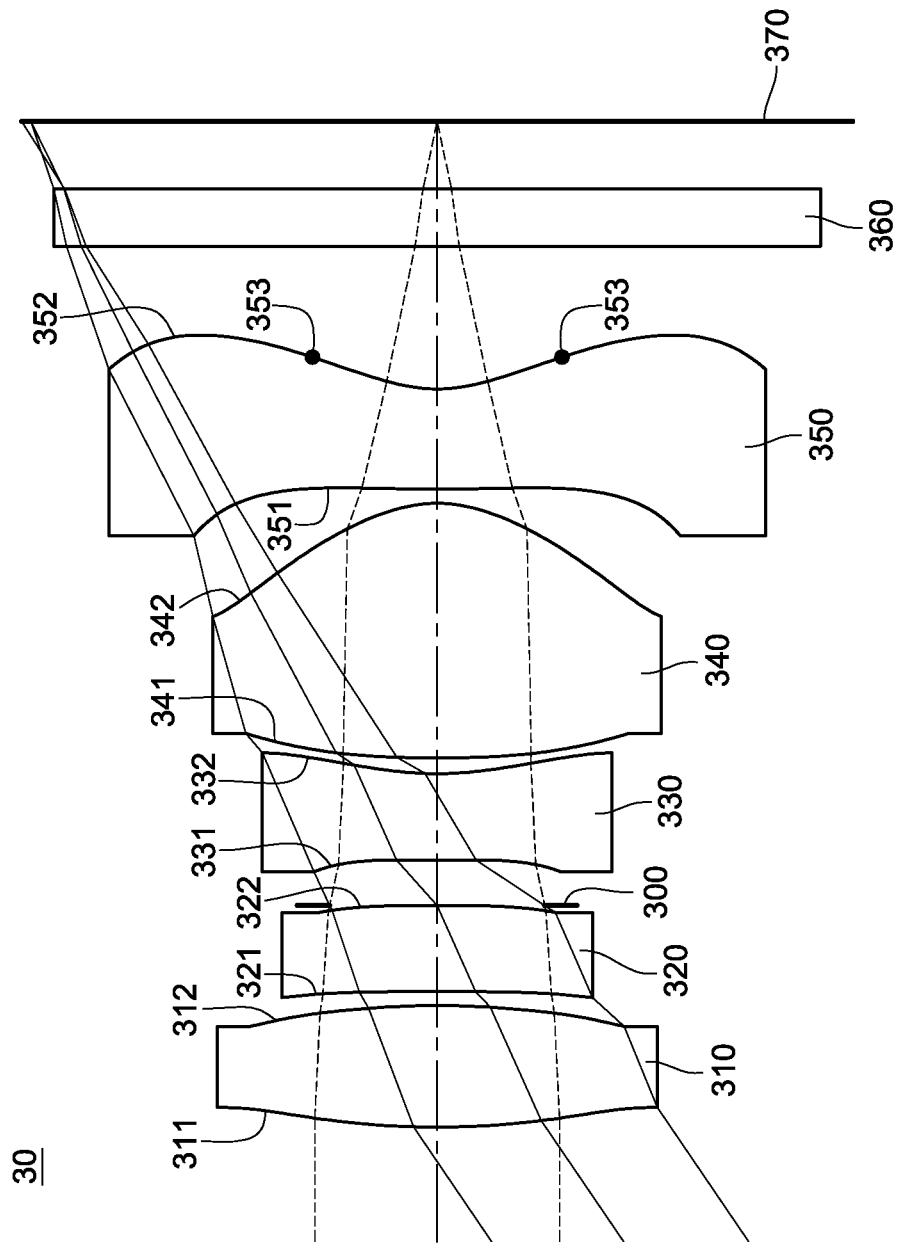
FIG. 3A is a schematic structural view of a third embodiment of the optical imaging system according to the present invention.

FIG. 3A is a schematic structural view of a third embodiment of the optical imaging system according to the present invention. The specific implementation and elements of the third embodiment are substantially the same as that in the first embodiment, wherein the element symbols all begin with "3", which correspond to those in the first embodiment with the same function or structure. For conciseness, only the differences are illustrated below, and the similarities will not be repeated herein.

In this embodiment, for example, the wavelength of the light received by the optical imaging system 30 is 587.6 nm, but the wavelength may be adjusted according to actual requirements, and is not limited to the wavelength value mentioned above.

Furthermore, the fourth lens element 340 and the fifth lens element 350 are aspheric lens elements, and the aspheric surfaces may satisfy Condition ASP, but are not limited thereto. As for the parameters of the aspheric surfaces, reference is made to Table 3-1 below.

TABLE 3-1

| Aspheric Coefficients | | | | | |
|---|---|---|---|---|---|
| | Surface# | | | | |
| | 1 | 2 | 3 | 4 | 6 |
| k | −1.61936E+01 | −1.00002E+00 | −1.19504E+01 | −1.67141E+01 | −4.09314E+01 |
| $A_4$ | 1.04054E−01 | 4.01439E−01 | 1.38053E−01 | −7.93118E−01 | −1.86401E+00 |
| $A_6$ | −4.31394E−01 | −1.37595E+00 | −2.87385E−01 | 1.11326E+00 | 2.46340E+00 |
| $A_8$ | 1.65593E+00 | 9.54772E−01 | −5.12145E+00 | −2.10770E+00 | −4.48049E+00 |
| $A_{10}$ | −4.32735E+00 | 7.80713E−01 | 1.35862E+01 | 5.33869E+00 | 1.21175E+01 |
| $A_{12}$ | 3.43888E+00 | −3.62174E−01 | 1.36511E+01 | −6.15947E+00 | −1.26029E+01 |
| $A_{14}$ | 4.65664E−02 | 1.16384E+00 | −4.59678E+01 | 1.82352E+01 | — |
| | Surface# | | | | |
| | 7 | 8 | 9 | 10 | 11 |
| k | −1.00000E+00 | −1.00000E+00 | −3.54549E+00 | −1.00000E+00 | −5.51825E+00 |
| $A_4$ | −9.62754E−01 | 3.89014E−01 | −5.60690E−01 | −1.32311E−01 | −3.07567E−01 |
| $A_6$ | 1.71920E+00 | −6.21028E−01 | 8.42758E−01 | −1.02946E+00 | 1.91408E+00 |
| $A_8$ | −2.29204E+00 | 2.16311E−01 | −5.51874E−01 | 2.01291E+00 | −7.98823E−02 |
| $A_{10}$ | 1.04943E−01 | 7.90493E−01 | −3.78214E−01 | −1.12801E+00 | −3.88229E−02 |
| $A_{12}$ | 1.00536E+00 | −8.96128E−01 | 1.74651E+00 | −1.41947E+00 | 2.54442E−02 |
| $A_{14}$ | — | 3.15508E−01 | −7.06911E−01 | 1.21979E+00 | −1.74346E−03 |

In this embodiment, the first lens element 310 has a positive refractive power, the third lens element 330 has a negative refractive power, the fourth lens element 340 has a positive refractive power, and the fifth lens element 350 has a negative refractive power. The image-side surface 332 of the third lens element 330 is a concave surface, the image-side surface 342 of the fourth lens element 340 is a convex surface, and the image-side surface 352 of the fifth lens element 350 is a concave surface.

Two points of inflection 353 are on the image-side surface 352 of the fifth lens element 350. As a result, the angle at which light is projected onto the electronic sensor (not shown) of the image plane 370 from the off-axis field can be effectively reduced; thereby the aberration in the off-axis field of view is further corrected.

The detailed data of the optical imaging system 30 is as shown in Table 3-2 below.

TABLE 3-2

Embodiment 3
f = 2.07 mm, Fno = 2.40, HFOV = 34.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.86224(ASP) | 0.426 | Plastic | 1.544 | 55.9 | 2.56 |
| 2 | | −2.56876(ASP) | 0.050 | | | | |
| 3 | Lens 2 | −7.86780(ASP) | 0.300 | Plastic | 1.634 | 23.8 | −29.72 |
| 4 | | −13.70710(ASP) | 0.000 | | | | |
| 5 | Ape. Stop | Plano | 0.158 | | | | |
| 6 | Lens 3 | 7.63570(ASP) | 0.303 | Plastic | 1.634 | 23.8 | −2.23 |
| 7 | | 1.17603 (ASP) | 0.055 | | | | |
| 8 | Lens 4 | 4.76320(ASP) | 0.891 | Plastic | 1.544 | 55.9 | 0.84 |
| 9 | | −0.47478(ASP) | 0.050 | | | | |
| 10 | Lens 5 | 8.21940(ASP) | 0.350 | Plastic | 1.530 | 55.8 | −1.04 |
| 11 | | 0.50975(ASP) | 0.500 | | | | |
| 12 | IR-filter | Plano | 0.200 | Glass | 1.517 | 64.2 | — |
| 13 | | Plano | 0.236 | | | | |
| 14 | Image | Plano | — | | | | |

Note:
The reference wavelength is d-line 587.6 nm

The content of Table 3-3 may be deduced from Table 3-2.

TABLE 3-3

The Third Embodiment

| f (mm) | 2.07 | $R_{10}/f$ | 0.25 |
|---|---|---|---|
| Fno | 2.40 | $CT_3/CT_4$ | 0.34 |
| HFOV (deg.) | 34.2 | $|f/f_4| + |f/f_5|$ | 4.45 |
| $v_1 - v_3$ | 32.1 | SL/TTL | 0.78 |
| $v_1 - (v_2 + v_3)$ | 8.3 | Td (mm) | 2.58 |
| $|R_1/R_2|$ | 1.11 | $(\Sigma CT)/Td$ | 0.88 |

Figures 3B, 3C, 3D:
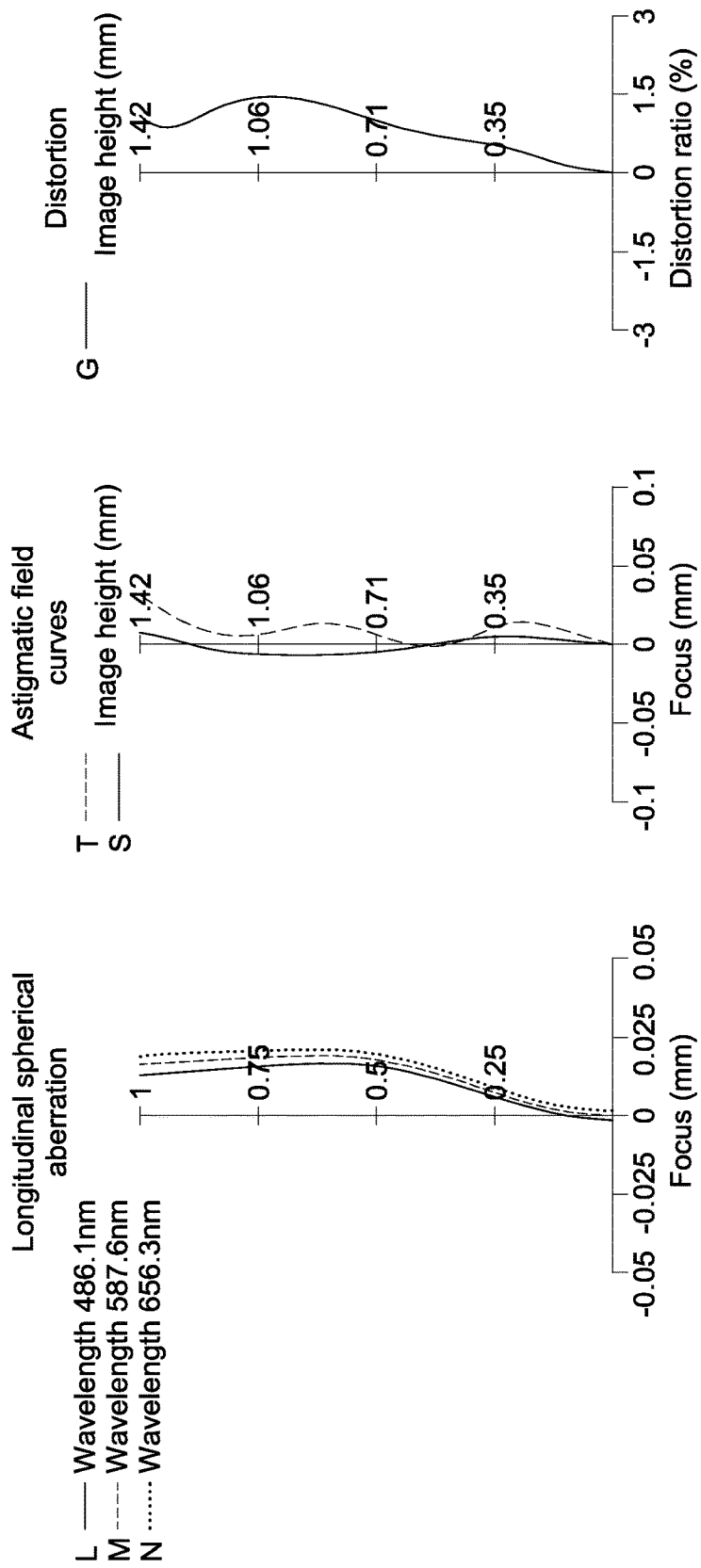
FIG. 3B is a schematic view of longitudinal spherical aberration curves when the lights having wavelengths of 486.1 nm, 587.6 nm, and 656.3 nm are respectively projected in the optical imaging system in FIG. 3A.
FIG. 3C is a schematic view of astigmatic field curves when the light having the wavelength of 587.6 nm is projected in the optical imaging system in FIG. 3A.
FIG. 3D is a schematic view of a distortion curve when the light having the wavelength of 587.6 nm is projected in the optical imaging system in FIG. 3A.

FIG. 3B is a schematic view of longitudinal spherical aberration curves when the lights having wavelengths of 486.1 nm, 587.6 nm, and 656.3 nm are respectively projected in the optical imaging system in FIG. 3A. It can be known from FIG. 3B that, when the different wavelengths, 486.1 nm, 587.6 nm, and 656.3 nm, of the light are received by the optical imaging system 30 of this embodiment, the longitudinal spherical aberrations generated by the optical imaging system 30 are within a range of −0.005 mm to 0.025 mm.

FIG. 3C is a schematic view of astigmatic field curves when the light having the wavelength of 587.6 nm is projected in the optical imaging system in FIG. 3A. It can be known from FIG. 3C that, the astigmatic field curvature of the tangential plane generated when the light having the wavelength of 587.6 nm is projected in the optical imaging system 30 is within a range of 0.00 mm to 0.05 mm, and the astigmatic field curvature of the sagittal plane is within a range of −0.025 mm to 0.025 mm.

FIG. 3D is a schematic view of a distortion curve when the light having the wavelength of 587.6 nm is projected in the optical imaging system in FIG. 3A. It can be known from FIG. 3D that, the distortion ratio generated when the light having the wavelength of 587.6 nm is projected in the optical imaging system 30 is within a range of 0.0% to 1.5%. As shown in FIGS. 3B to 3D, the optical imaging system 30, designed according to the third embodiment, is capable of effectively correcting various aberrations.

The Fourth Embodiment (Embodiment 4)

Figure 4A:
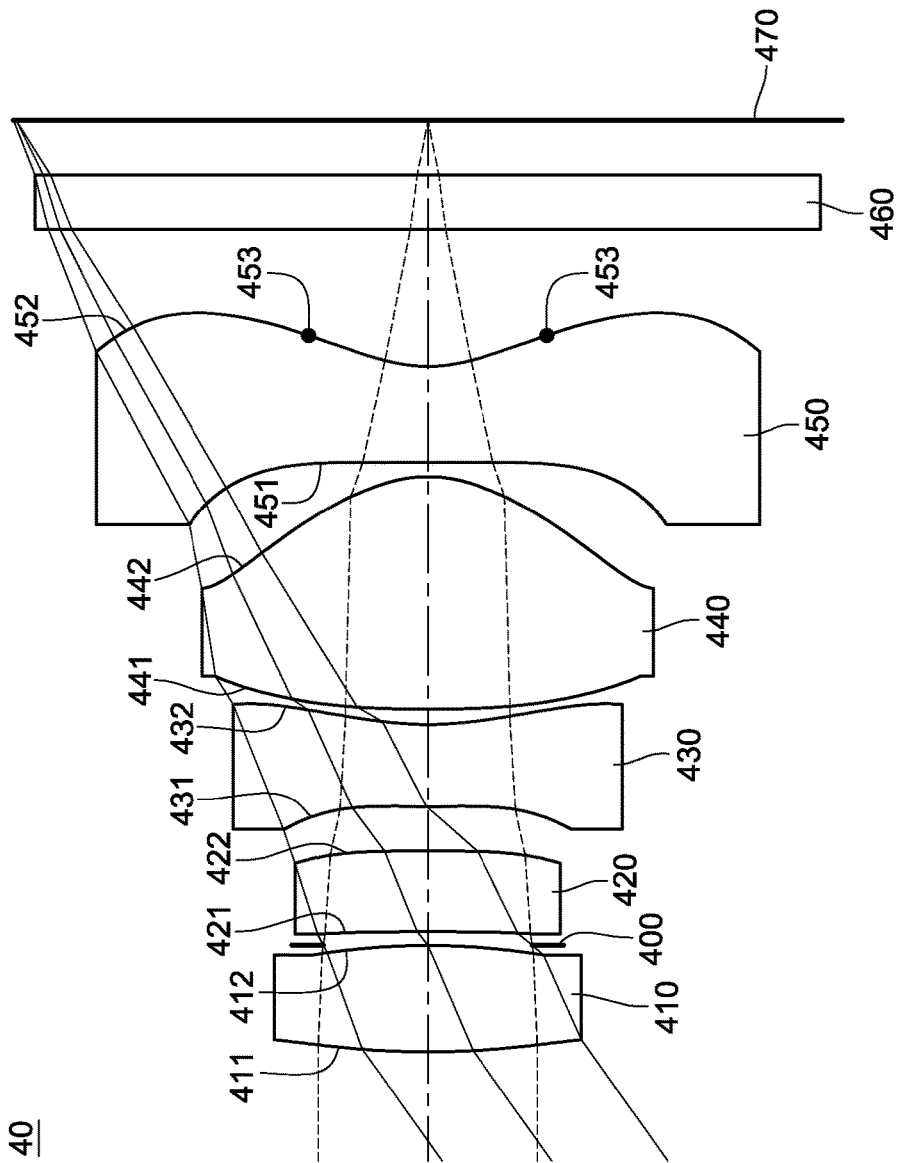
FIG. 4A is a schematic structural view of a fourth embodiment of the optical imaging system according to the present invention.

FIG. 4A is a schematic structural view of a fourth embodiment of the optical imaging system according to the present invention. The specific implementation and elements of the fourth embodiment are substantially the same as that in the first embodiment wherein the element symbols all begin with "4", which correspond to those in the first embodiment with the same function or structure. For conciseness, only the differences are illustrated below, and the similarities will not be repeated herein.

In this embodiment, for example, the wavelength of the light received by the optical imaging system 40 is 587.6 nm, but the wavelength may be adjusted according to actual requirements, and is not limited to the wavelength value mentioned above.

Furthermore, the fourth lens element 440 and the fifth lens element 450 are aspheric lens elements, and the aspheric surfaces may satisfy Condition ASP, but are not limited thereto. As for the parameters of the aspheric surfaces, reference is made to Table 4-1 below.

TABLE 4-1

Aspheric Coefficients

| | Surface# | | | | |
|---|---|---|---|---|---|
| | 1 | 2 | 4 | 5 | 6 |
| k | −2.71907E+01 | −1.04613E+00 | −1.00045E+00 | −1.00353E+00 | −1.26986E+01 |
| $A_4$ | 9.36941E−02 | 3.69361E−01 | 1.32661E−01 | −8.72116E−01 | −1.86014E+00 |
| $A_6$ | −4.54025E−01 | −1.41798E+00 | −5.96426E−01 | 1.05997E+00 | 2.34935E+00 |
| $A_8$ | 1.42547E+00 | 8.27844E−01 | −4.73347E+00 | −2.61424E+00 | −4.42468E+00 |
| $A_{10}$ | −4.30223E+00 | 8.94293E−01 | 1.32218E+01 | 6.37421E+00 | 1.50494E+01 |
| $A_{12}$ | 3.43884E+00 | −3.62137E−01 | 1.36511E+01 | −6.15949E+00 | −1.26029E+01 |
| $A_{14}$ | 4.65669E−02 | 1.16385E+00 | −4.59678E+01 | 1.82352E+01 | — |

TABLE 4-1-continued

| Aspheric Coefficients | | | | |
|---|---|---|---|---|
| Surface# | | | | |
| 7 | 8 | 9 | 10 | 11 |
| k   −1.00000E+00 | −1.00000E+00 | −3.52839E+00 | −1.00000E+00 | −5.37084E+00 |
| $A_4$   −9.26431E−01 | 3.95906E−01 | −5.46740E−01 | −1.73121E−01 | −3.11239E−01 |
| $A_6$   1.74503E+00 | −6.13452E−01 | 8.28861E−01 | −1.00465E+00 | 1.92385E−01 |
| $A_8$   −2.25472E+00 | 2.13018E−01 | −5.71325E−01 | 1.95808E+00 | −7.42147E−02 |
| $A_{10}$   2.25785E−01 | 7.60582E−01 | −3.92708E−01 | −1.14271E+00 | −3.69924E−02 |
| $A_{12}$   9.96953E−01 | −9.35940E−01 | 1.74869E+00 | −1.36548E+00 | 2.81192E−02 |
| $A_{14}$   — | 4.30135E−01 | −6.72104E−01 | 1.26129E+00 | −3.30159E−03 |

In this embodiment, the first lens element 410 has a positive refractive power, the third lens element 430 has a negative refractive power, the fourth lens element 440 has a positive refractive power, and the fifth lens element 450 has a negative refractive power. The image-side surface 432 of the third lens element 430 is a concave surface, the image-side surface 442 of the fourth lens element 440 is a convex surface, and the image-side surface 452 of the fifth lens element 450 is a concave surface.

Two points of inflection 453 are on the image-side surface 452 of the fifth lens element 450. As a result, the angle at which light is projected onto the electronic sensor (not shown) of the image plane 470 from the off-axis field can be effectively reduced; thereby the aberration in the off-axis field of view is further corrected.

The detailed data of the optical imaging system 40 is as shown in Table 4-2 below.

FIG. 4B is a schematic view of longitudinal spherical aberration curves when the lights having wavelengths of 486.1 nm, 587.6 nm, and 656.3 nm are respectively projected in the optical imaging system in FIG. 4A. It can be known from FIG. 4B that, when the different wavelengths, 486.1 nm, 587.6 nm, and 656.3 nm, of the light are received by the optical imaging system 40 of this embodiment, the longitudinal spherical aberrations generated by the optical imaging system 40 are within a range of −0.005 mm to 0.025 mm.

FIG. 4C is a schematic view of astigmatic field curves when the light having the wavelength of 587.6 nm is projected in the optical imaging system in FIG. 4A. It can be known from FIG. 4C that, the astigmatic field curvature of the tangential plane generated when the light having the wavelength of 587.6 nm is projected in the optical imaging

TABLE 4-2

Embodiment 4
f = 2.09 mm, Fno = 2.60, HFOV = 35.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.94368(ASP) | 0.388 | Plastic | 1.544 | 55.9 | 2.39 |
| 2 | | −2.21910(ASP) | 0.000 | | | | |
| 3 | Ape. Stop | Plano | 0.050 | | | | |
| 4 | Lens 2 | −8.13710(ASP) | 0.295 | Plastic | 1.634 | 23.8 | −32.50 |
| 5 | | −13.63530(ASP) | 0.162 | | | | |
| 6 | Lens 3 | 9.27750(ASP) | 0.299 | Plastic | 1.634 | 23.8 | −2.24 |
| 7 | | 1.21603(ASP) | 0.056 | | | | |
| 8 | Lens 4 | 5.52030(ASP) | 0.849 | Plastic | 1.544 | 55.9 | 0.84 |
| 9 | | −0.46878(ASP) | 0.051 | | | | |
| 10 | Lens 5 | 14.27450(ASP) | 0.350 | Plastic | 1.530 | 55.8 | −0.97 |
| 11 | | 0.48989(ASP) | 0.500 | | | | |
| 12 | IR-filter | Plano | 0.200 | Glass | 1.517 | 64.2 | — |
| 13 | | Plano | 0.199 | | | | |
| 14 | Image | Plano | — | | | | |

Note:
The reference wavelength is d-line 587.6 nm

The content of Table 4-3 may be deduced from Table 4-2.

TABLE 4-3

| The Fourth Embodiment | | | |
|---|---|---|---|
| f (mm) | 2.09 | $R_{10}/f$ | 0.23 |
| Fno | 2.60 | $CT_3/CT_4$ | 0.35 |
| HFOV (deg.) | 35.3 | $|f/f_4| + |f/f_5|$ | 4.64 |
| $v_1 − v_3$ | 32.1 | SL/TTL | 0.88 |
| $v_1 − (v_2 + v_3)$ | 8.3 | Td (mm) | 2.50 |
| $|R_1/R_2|$ | 1.33 | $(\Sigma CT)/Td$ | 0.87 | system 40 is within a range of −0.02 mm to 0.02 mm, and the astigmatic field curvature of the sagittal plane is within a range of −0.01 mm to 0.01 mm.

FIG. 4D is a schematic view of a distortion curve when the light having the wavelength of 587.6 nm is projected in the optical imaging system in FIG. 4A. It can be known from FIG. 4D that, the distortion ratio generated when the light having the wavelength of 587.6 nm is projected in the optical imaging system 40 is within a range of 0.0% to 1.5%. As shown in FIGS. 4B to 4D, the optical imaging system 40, designed according to the fourth embodiment, is capable of effectively correcting various aberrations.

The Fifth Embodiment (Embodiment 5)

Figure 5A:
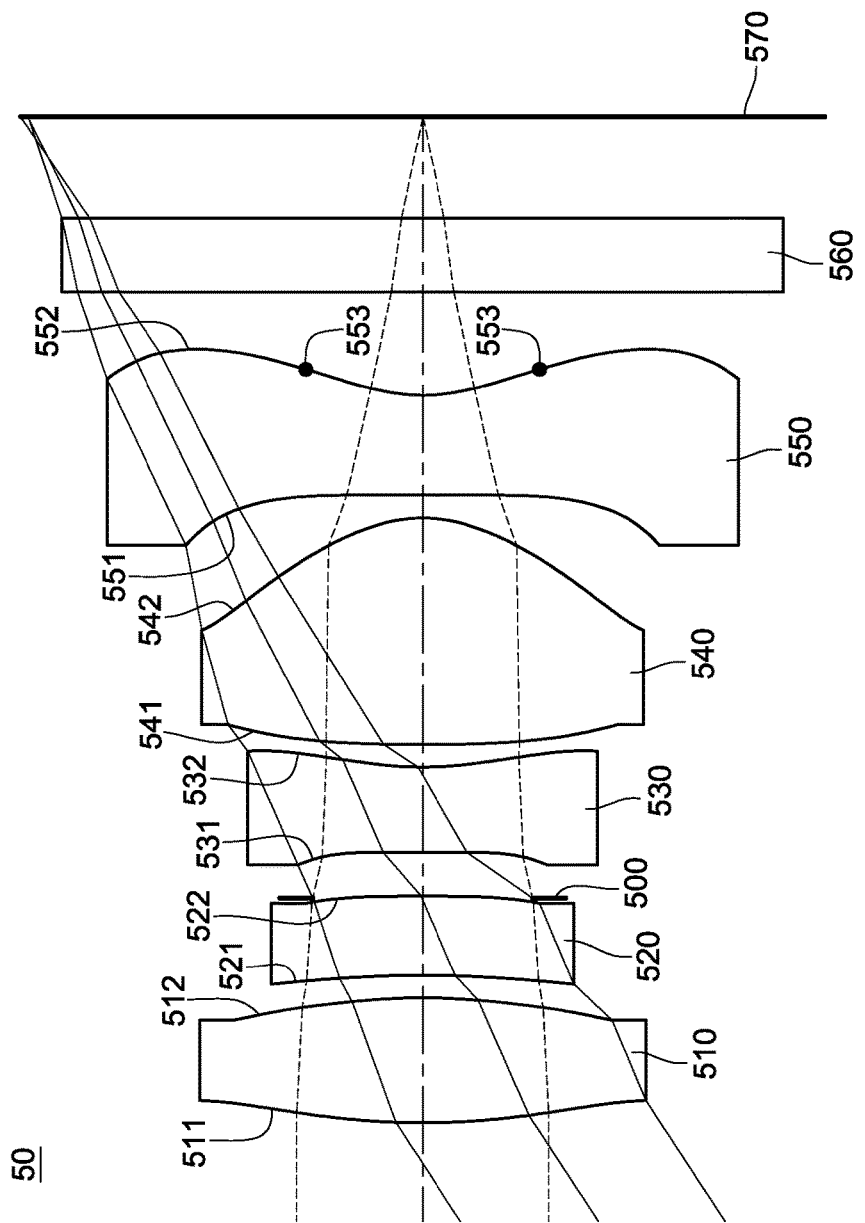
FIG. 5A is a schematic structural view of a fifth embodiment of the optical imaging system according to the present invention.

FIG. 5A is a schematic structural view of a fifth embodiment of the optical imaging system according to the present invention. The specific implementation and elements of the fifth embodiment are substantially the same as that in the first embodiment, wherein the element symbols all begin with "5", which correspond to those in the first embodiment with the same function or structure. For conciseness, only the differences are illustrated below, and the similarities will not be repeated herein.

In this embodiment, for example, the wavelength of the light received by the optical imaging system 50 is 587.6 nm, but the wavelength may be adjusted according to actual requirements, and is not limited to the wavelength value mentioned above.

Furthermore, the fourth lens element 540 and the fifth lens element 550 are aspheric lens elements, and the aspheric surfaces may satisfy Condition ASP, but are not limited thereto. As for the parameters of the aspheric surfaces, reference is made to Table 5-1 below.

TABLE 5-1

Aspheric Coefficients

| | Surface# | | | | |
|---|---|---|---|---|---|
| | 1 | 2 | 3 | 4 | 6 |
| k | −1.50145E+01 | −1.31106E+00 | −4.02631E+01 | −5.00000E+01 | −5.00000E+01 |
| $A_4$ | 6.42994E−02 | 2.80409E−01 | 1.41994E−01 | −5.23750E−01 | −1.30890E+00 |
| $A_6$ | −2.24829E−01 | −5.43527E−01 | −2.07963E−01 | 6.47265E−01 | 1.00562E+00 |
| $A_8$ | 6.19389E−01 | 2.76742E−01 | −1.28457E+00 | −1.20074E+00 | −1.16549E+00 |
| $A_{10}$ | −1.13564E+00 | 1.21952E−01 | 2.65205E+00 | 1.74842E+00 | 2.72020E+00 |
| $A_{12}$ | 7.44178E−01 | −7.40818E−02 | 2.80360E+00 | −1.26531E+00 | −2.58468E+00 |
| $A_{14}$ | −7.90819E−02 | 1.79791E−01 | −7.06062E+00 | 2.79932E+00 | — |

| | Surface# | | | | |
|---|---|---|---|---|---|
| | 7 | 8 | 9 | 10 | 11 |
| k | −1.00000E+00 | −1.00000E+00 | −3.36252E+00 | −1.00000E+00 | −6.05794E+00 |
| $A_4$ | −7.05881E−01 | 2.50534E−01 | −3.63066E−01 | −5.32987E−02 | −2.03209E−01 |
| $A_6$ | 8.38375E−01 | −2.83129E−01 | 4.14809E−01 | −5.40087E−01 | 8.72611E−02 |
| $A_8$ | −7.06966E−01 | 7.59671E−02 | −2.01122E−01 | 7.44500E−01 | −2.67820E−02 |
| $A_{10}$ | −9.18350E−02 | 2.08222E−01 | −9.97632E−02 | −3.10556E−01 | −1.07637E−02 |
| $A_{12}$ | 2.05927E−01 | −1.79560E−01 | 3.57072E−01 | −3.13152E−01 | 5.88785E−03 |
| $A_{14}$ | — | 4.86768E−02 | −1.09566E−01 | 2.07542E−01 | −5.18749E−04 |

In this embodiment, the first lens element 510 has a positive refractive power, the third lens element 530 has a negative refractive power, the fourth lens element 540 has a positive refractive power, and the fifth lens element 550 has a negative refractive power. The image-side surface 532 of the third lens element 530 is a concave surface, the image-side surface 542 of the fourth lens element 540 is a convex surface, and the image-side surface 552 of the fifth lens element 550 is a concave surface.

Two points of inflection 553 are on the image-side surface 552 of the fifth lens element 550. As a result, the angle at which light is projected onto the electronic sensor (not shown) of the image plane 570 from the off-axis field can be effectively reduced; thereby the aberration in the off-axis field of view is further corrected.

The detailed data of the optical imaging system 50 is as shown in Table 5-2 below.

TABLE 5-2

Embodiment 5
f = 2.47 mm, Fno = 2.40, HFOV = 33.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.10024(ASP) | 0.506 | Plastic | 1.544 | 55.9 | 2.59 |
| 2 | | −2.42994(ASP) | 0.091 | | | | |
| 3 | Lens 2 | −3.96408(ASP) | 0.323 | Plastic | 1.634 | 23.8 | −9.07 |
| 4 | | −13.16931(ASP) | −0.010 | | | | |
| 5 | Ape. Stop | Plano | 0.186 | | | | |
| 6 | Lens 3 | 5.35285(ASP) | 0.345 | Plastic | 1.634 | 23.8 | −3.04 |
| 7 | | 1.38252(ASP) | 0.092 | | | | |
| 8 | Lens 4 | 10.79197(ASP) | 0.919 | Plastic | 1.544 | 55.9 | 1.02 |
| 9 | | −0.56483(ASP) | 0.092 | | | | |

TABLE 5-2-continued

Embodiment 5
f = 2.47 mm, Fno = 2.40, HFOV = 33.2 deg.

| Surface # | | Curvature Radius | Thickness | Material | Index | Abbe # | Focal length |
|---|---|---|---|---|---|---|---|
| 10 | Lens 5 | 61.60100(ASP) | 0.404 | Plastic | 1.530 | 55.8 | −1.27 |
| 11 | | 0.66453(ASP) | 0.420 | | | | |
| 12 | IR-filter | Plano | 0.300 | Glass | 1.517 | 64.2 | — |
| 13 | | Plano | 0.410 | | | | |
| 14 | Image | Plano | — | | | | |

Note:
The reference wavelength is d-line 587.6 nm

The content of Table 5-3 may be deduced from Table 5-2.

TABLE 5-3

The Fifth Embodiment

| | | | |
|---|---|---|---|
| f (mm) | 2.47 | $R_{10}/f$ | 0.27 |
| Fno | 2.40 | $CT_3/CT_4$ | 0.38 |
| HFOV (deg.) | 33.2 | $|f/f_4| + |f/f_5|$ | 4.37 |
| $v_1 - v_3$ | 32.1 | SL/TTL | 0.77 |
| $v_1 - (v_2 + v_3)$ | 8.3 | Td (mm) | 2.95 |
| $|R_1/R_2|$ | 1.28 | $(\Sigma CT)/Td$ | 0.85 |

FIG. 5B is a schematic view of longitudinal spherical aberration curves when the lights having wavelengths of 486.1 nm, 587.6 nm, and 656.3 nm are respectively projected in the optical imaging system in FIG. 5A. It can be known from FIG. 5B that, when the different wavelengths, 486.1 nm, 587.6 nm, and 656.3 nm, of the light are received by the optical imaging system 50 of this embodiment, the longitudinal spherical aberrations generated by the optical imaging system 50 are within a range of −0.005 mm to 0.025 mm.

FIG. 5C is a schematic view of astigmatic field curves when the light having the wavelength of 587.6 nm is projected in the optical imaging system in FIG. 5A. It can be known from FIG. 5C that, the astigmatic field curvature of the tangential plane generated when the light having the wavelength of 587.6 nm is projected in the optical imaging system 50 is within a range of −0.02 mm to 0.02 mm, and the astigmatic field curvature of the sagittal plane is within a range of −0.01 mm to 0.01 mm.

FIG. 5D is a schematic view of a distortion curve when the light having the wavelength of 587.6 nm is projected in the optical imaging system in FIG. 5A. It can be known from FIG. 5D that, the distortion ratio generated when the light having the wavelength of 587.6 nm is projected in the optical imaging system 50 is within a range of 0.0% to 1.5%. As shown in FIGS. 5B to 5D, the optical imaging system 50, designed according to the fifth embodiment, is capable of effectively correcting various aberrations.

The Sixth Embodiment (Embodiment 6)

Figure 6A:
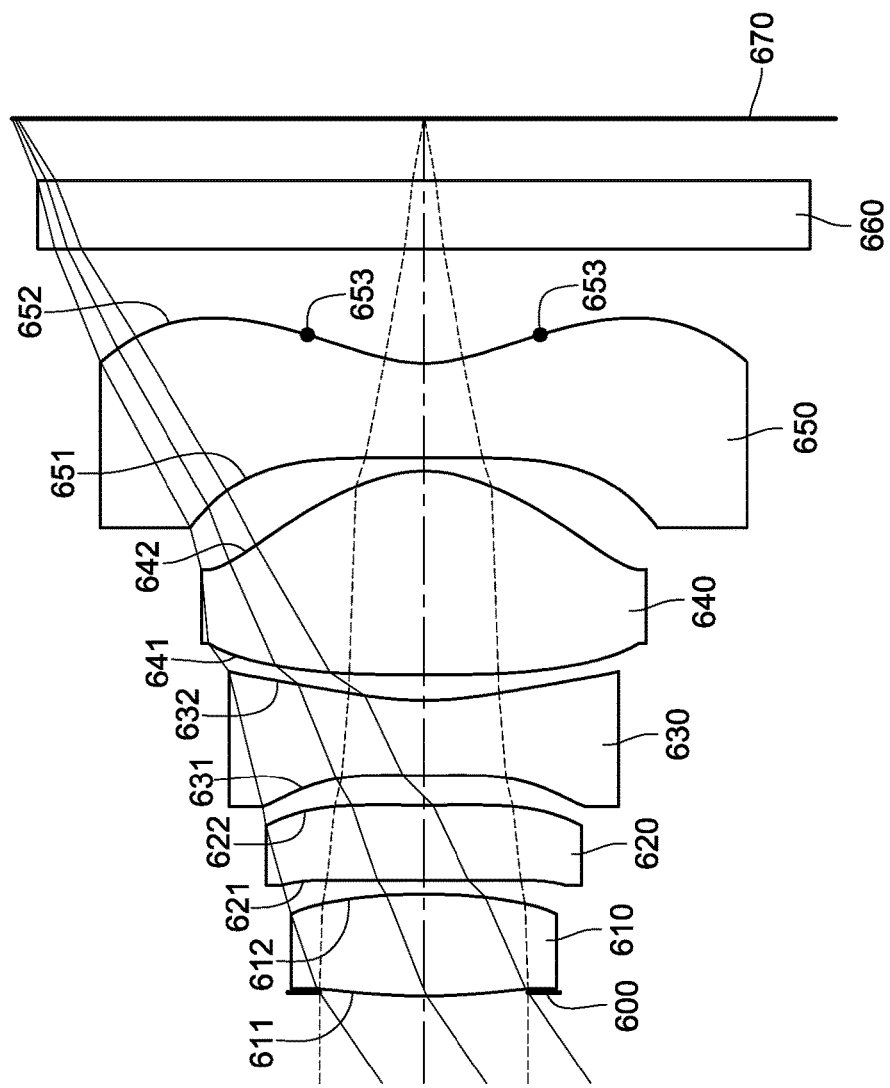
FIG. 6A is a schematic structural view of a sixth embodiment of the optical imaging system according to the present invention.

FIG. 6A is a schematic structural view of a sixth embodiment of the optical imaging system according to the present invention. The specific implementation and elements of the sixth embodiment are substantially the same as that in the first embodiment, wherein the element symbols all begin with "6", which correspond to those in the first embodiment with the same function or structure. For conciseness, only the differences are illustrated below, and the similarities will not be repeated herein.

In this embodiment, for example, the wavelength of the light received by the optical imaging system 60 is 587.6 nm, but the wavelength may be adjusted according to actual requirements, and is not limited to the wavelength value mentioned above.

Furthermore, the fourth lens element 640 and the fifth lens element 650 are aspheric lens elements, and the aspheric surfaces may satisfy Condition ASP, but are not limited thereto. As for the parameters of the aspheric surfaces, reference is made to Table 6-1 below.

TABLE 6-1

Aspheric Coefficients

| | Surface# | | | | |
|---|---|---|---|---|---|
| | 2 | 3 | 4 | 5 | 6 |
| k | −2.56678E+01 | −1.00000E+00 | −5.00000E+01 | −5.00000E+01 | −5.00000E+01 |
| $A_4$ | 4.50882E−02 | 6.01413E−02 | 6.42924E−02 | −5.34386E−01 | −1.15319E+00 |
| $A_6$ | −3.85839E−01 | −7.64384E−01 | −3.43783E−01 | 4.12840E−01 | 1.02913E+00 |
| $A_8$ | 8.55999E−01 | 2.25261E−01 | −1.29643E+00 | −1.18132E+00 | −1.29479E+00 |
| $A_{10}$ | −3.00666E+00 | −2.40295E−01 | 1.35647E+00 | 1.22341E+00 | 3.50498E+00 |
| $A_{12}$ | 5.62307E−01 | −5.92145E−02 | 2.23218E+00 | −1.00718E+00 | −2.06078E+00 |
| $A_{14}$ | 5.47981E−03 | 1.36921E−01 | −5.40787E+00 | 2.14528E+00 | — |

| | Surface# | | | | |
|---|---|---|---|---|---|
| | 7 | 8 | 9 | 10 | 11 |
| k | −1.00000E+00 | −1.00000E+00 | −3.74355E+00 | −1.00000E+00 | −5.95481E+00 |
| $A_4$ | −5.42414E−01 | 2.52258E−01 | −3.05618E−01 | −1.37951E−01 | −2.06384E−01 |
| $A_6$ | 7.81323E−01 | −2.45807E−01 | 3.63504E−01 | −4.24109E−01 | 8.21665E−02 |
| $A_8$ | −6.67231E−01 | 7.39065E−02 | −1.81575E−01 | 5.89907E−01 | −2.02223E−02 |
| $A_{10}$ | 1.18737E−01 | 1.67186E−01 | −8.80340E−02 | −2.60329E−01 | −8.55135E−03 |
| $A_{12}$ | 1.74537E−01 | −1.57052E−01 | 2.86141E−01 | −2.08140E−01 | 4.72643E−03 |
| $A_{14}$ | — | 6.53847E−02 | −6.79578E−02 | 1.63191E−01 | −4.32395E−04 |

In this embodiment, the first lens element 610 has a positive refractive power, the third lens element 630 has a negative refractive power, the fourth lens element 640 has a positive refractive power, and the fifth lens element 650 has a negative refractive power. The image-side surface 632 of the third lens element 630 is a concave surface, the image-side surface 642 of the fourth lens element 640 is a convex surface, and the image-side surface 652 of the fifth lens element 650 is a concave surface.

Two points of inflection 653 are on the image-side surface 652 of the fifth lens element 650. As a result, the angle at which light is projected onto the electronic sensor (not shown) of the image plane 670 from the off-axis field can be effectively reduced; thereby the aberration in the off-axis field of view is further corrected.

The detailed data of the optical imaging system 60 is as shown in Table 6-2 below.

TABLE 6-2

Embodiment 6
f = 2.58 mm, Fno = 2.80, HFOV = 34.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.015 | | | | |
| 2 | Lens 1 | 2.84026(ASP) | 0.446 | Plastic | 1.544 | 55.9 | 2.53 |
| 3 | | −2.51521(ASP) | 0.059 | | | | |
| 4 | Lens 2 | 34.68370(ASP) | 0.330 | Plastic | 1.634 | 23.8 | −33.90 |
| 5 | | 13.22120(ASP) | 0.131 | | | | |
| 6 | Lens 3 | 9.36170(ASP) | 0.330 | Plastic | 1.634 | 23.8 | −2.78 |
| 7 | | 1.46213(ASP) | 0.112 | | | | |
| 8 | Lens 4 | 21.25430(ASP) | 0.894 | Plastic | 1.544 | 55.9 | 1.04 |
| 9 | | −0.57310(ASP) | 0.059 | | | | |
| 10 | Lens 5 | −121.96100(ASP) | 0.413 | Plastic | 1.530 | 55.8 | −1.15 |
| 11 | | 0.61105(ASP) | 0.500 | | | | |
| 12 | IR-filter | Plano | 0.300 | Glass | 1.517 | 64.2 | — |
| 13 | | Plano | 0.271 | | | | |
| 14 | Image | Plano | — | | | | |

Note:
The reference wavelength is d-line 587.6 nm

The content of Table 6-3 may be deduced from Table 6-2.

TABLE 6-3

The Sixth Embodiment

| f (mm) | 2.58 | $R_{10}/f$ | 0.24 |
|---|---|---|---|
| Fno | 2.80 | $CT_3/CT_4$ | 0.37 |
| HFOV (deg.) | 34.4 | $|f/f_4| + |f/f_5|$ | 4.72 |
| $v_1 - v_3$ | 32.1 | SL/TTL | 1.00 |
| $v_1 - (v_2 + v_3)$ | 8.3 | Td (mm) | 2.77 |
| $|R_1/R_2|$ | 1.13 | $(\Sigma CT)/Td$ | 0.87 |

Figures 6B, 6C, 6D:
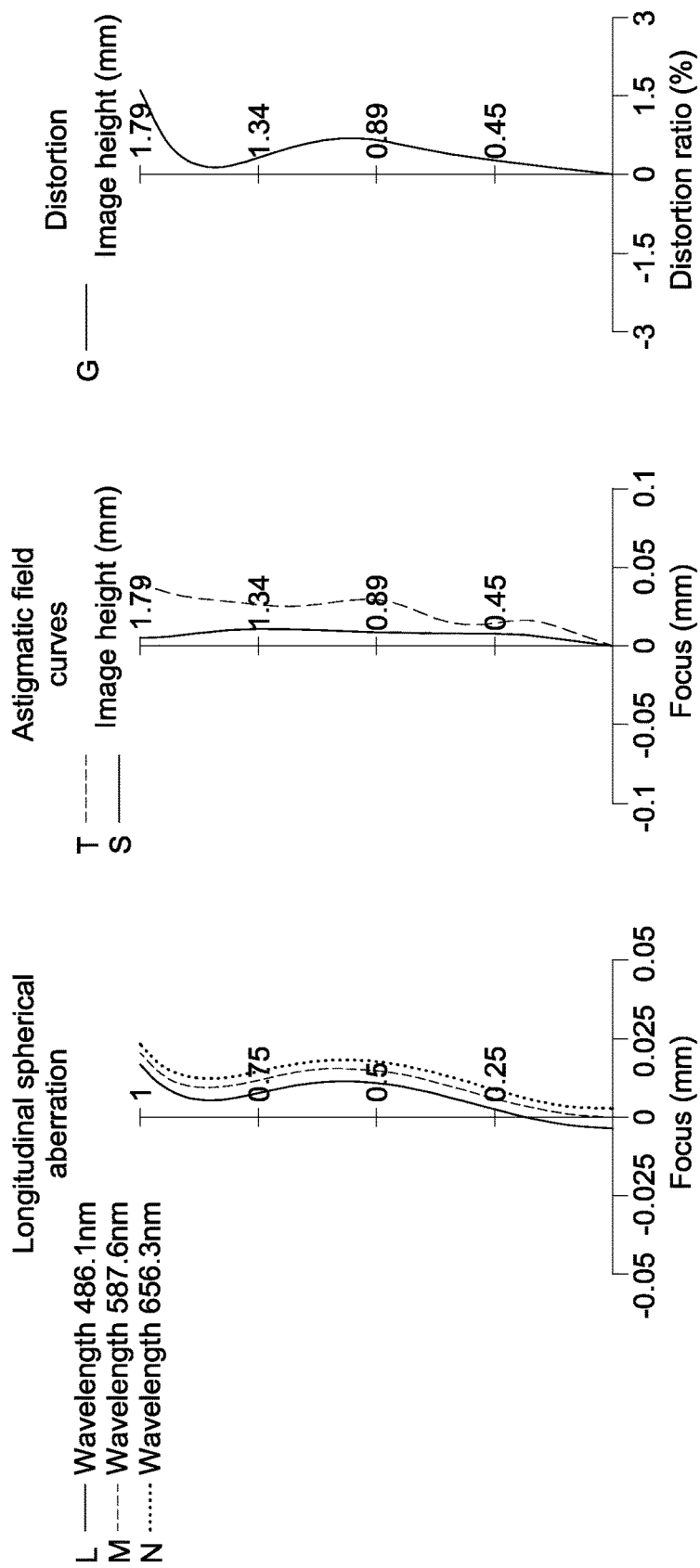
FIG. 6B is a schematic view of longitudinal spherical aberration curves when the lights having wavelengths of 486.1 nm, 587.6 nm, and 656.3 nm are respectively projected in the optical imaging system in FIG. 6A.
FIG. 6C is a schematic view of astigmatic field curves when the light having the wavelength of 587.6 nm is projected in the optical imaging system in FIG. 6A.
FIG. 6D is a schematic view of a distortion curve when the light having the wavelength of 587.6 nm is projected in the optical imaging system in FIG. 6A.

FIG. 6B is a schematic view of longitudinal spherical aberration curves when the lights having a wavelength of 486.1 nm, 587.6 nm, and 656.3 nm are respectively projected in the optical imaging system in FIG. 6A. It can be known from FIG. 6B that, when the different wavelengths, 486.1 nm, 587.6 nm, and 656.3 nm, of the light received by the optical imaging system 60 of this embodiment, the longitudinal spherical aberrations generated by the optical imaging system 60 are within a range of −0.005 mm to 0.025 mm.

FIG. 6C is a schematic view of astigmatic field curves when the light having the wavelength of 587.6 nm is projected in the optical imaging system in FIG. 6A. It can be known from FIG. 6C that, the astigmatic field curvature of the tangential plane generated when the light having the wavelength of 587.6 nm is projected in the optical imaging system 60 is within a range of 0.00 mm to 0.05 mm, and the astigmatic field curvature of the sagittal plane is within a range of 0.00 mm to 0.01 mm.

FIG. 6D is a schematic view of a distortion curve when the light having the wavelength of 587.6 nm is projected in the optical imaging system in FIG. 6A. It can be known from FIG. 6D that, the distortion ratio generated when the light having the wavelength of 587.6 nm is projected in the optical imaging system 60 is within a range of 0.0% to 1.5%. As shown in FIGS. 6B to 6D, the optical imaging system 60, designed according to the sixth embodiment, is capable of effectively correcting various aberrations.

The Seventh Embodiment (Embodiment 7)

Figure 7A:
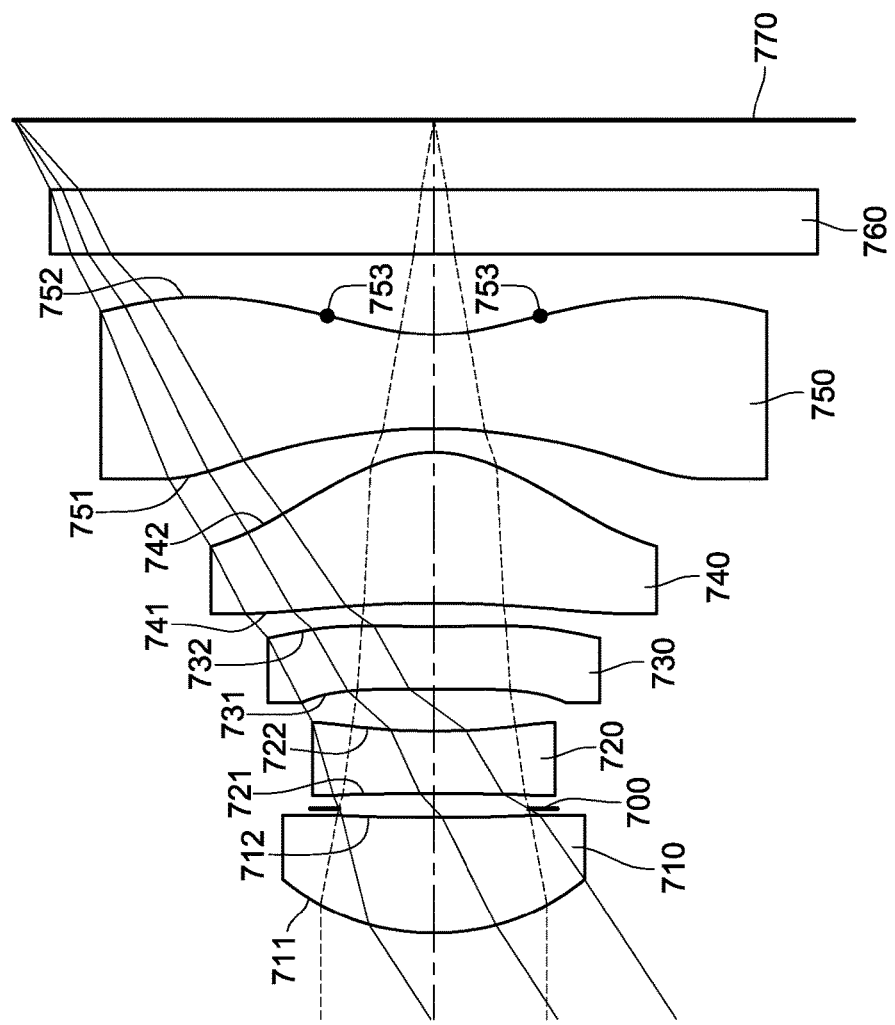
FIG. 7A is a schematic structural view of a seventh embodiment of the optical imaging system according to the present invention.

FIG. 7A is a schematic structural view of a seventh embodiment of the optical imaging system according to the present invention. The specific implementation and elements of the seventh embodiment are substantially the same as that in the first embodiment, wherein the element symbols all begin with "7", which correspond to those in the first embodiment with the same function or structure. For conciseness, only the differences are illustrated below, and the similarities will not be repeated herein.

In this embodiment, for example, the wavelength of the light received by the optical imaging system 70 is 587.6 nm, but the wavelength may be adjusted according to actual requirements, and is not limited to the wavelength value mentioned above.

Furthermore, the fourth lens element 740 and the fifth lens element 750 are aspheric lens elements, and the aspheric surfaces may satisfy Condition ASP, but are not limited thereto. As for the parameters of the aspheric surfaces, reference is made to Table 7-1 below.

TABLE 7-1

Aspheric Coefficients

| Surface# | 1 | 2 | 4 | 5 | 6 |
|---|---|---|---|---|---|
| k | −7.22585E+00 | −1.00000E+00 | −1.00000E+00 | −1.54784E+01 | −1.00000E+00 |
| $A_4$ | 6.16997E−01 | 3.86788E−02 | −3.74867E−03 | 7.19601E−02 | −3.92881E−01 |
| $A_6$ | −9.18352E−01 | 4.71557E−01 | −2.26139E−01 | −3.41956E−01 | −6.21218E−01 |
| $A_8$ | 1.76699E+00 | −4.64795E+00 | −8.32793E−01 | 4.95651E−01 | 3.02433E+00 |
| $A_{10}$ | −1.73133E+00 | 9.78303E+00 | −8.76976E+00 | −4.79255E+00 | −7.87291E+00 |
| $A_{12}$ | 7.29073E−01 | −7.66940E+00 | 3.36814E+01 | 1.05920E+01 | 6.81032E+00 |
| $A_{14}$ | −7.25578E−01 | 4.51909E+00 | −3.01499E+01 | −7.05775E+00 | — |

| Surface# | 7 | 8 | 9 | 10 | 11 |
|---|---|---|---|---|---|
| k | −1.00000E+00 | 1.41207E+01 | −3.46374E+00 | −2.76145E+01 | −9.40106E+00 |
| $A_4$ | −2.48174E−01 | 1.70360E−02 | −2.75764E−01 | −3.38689E−02 | −1.22267E−01 |
| $A_6$ | −4.59185E−01 | 3.07020E−01 | 7.03269E−01 | −9.95705E−02 | 7.02073E−02 |
| $A_8$ | 1.15220E+00 | −1.64137E+00 | −9.27036E−01 | 9.52868E−02 | −4.42417E−02 |
| $A_{10}$ | −8.26374E−01 | 3.97155E+00 | 8.68034E−01 | −1.00216E−02 | 1.89558E−02 |
| $A_{12}$ | 4.12177E−01 | −4.03841E+00 | −4.07510E−01 | −5.19683E−03 | −4.62314E−03 |
| $A_{14}$ | — | 1.43511E+00 | 5.54502E−02 | 2.59811E−04 | 5.31015E−04 |

In this embodiment, the first lens element 710 has a positive refractive power, the third lens element 730 has a negative refractive power, the fourth lens element 740 has a positive refractive power, and the fifth lens element 750 has a negative refractive power. The image-side surface 732 of the third lens element 730 is a concave surface, the image-side surface 742 of the fourth lens element 740 is a convex surface, and the image-side surface 752 of the fifth lens element 750 is a concave surface.

Two points of inflection 753 are on the image-side surface 752 of the fifth lens element 750. As a result, the angle at which light is projected onto the electronic sensor (not shown) of the image plane 770 from the off-axis field can be effectively reduced; thereby the aberration in the off-axis field of view is further corrected.

The detailed data of the optical imaging system 70 is as shown in Table 7-2 below.

TABLE 7-2

Embodiment 7
f = 2.97 mm, Fno = 2.80, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.14173(ASP) | 0.539 | Plastic | 1.530 | 55.8 | 2.36 |
| 2 | | 11.11800(ASP) | 0.040 | | | | |
| 3 | Ape. Stop | Plano | 0.070 | | | | |
| 4 | Lens 2 | −42.64390(ASP) | 0.290 | Plastic | 1.650 | 21.4 | −4.30 |
| 5 | | 2.99657(ASP) | 0.195 | | | | |
| 6 | Lens 3 | 36.43440(ASP) | 0.290 | Plastic | 1.650 | 21.4 | −19.94 |
| 7 | | 9.52840(ASP) | 0.112 | | | | |
| 8 | Lens 4 | −5.08670(ASP) | 0.700 | Plastic | 1.530 | 55.8 | 1.18 |
| 9 | | −0.58339(ASP) | 0.110 | | | | |
| 10 | Lens 5 | −2.05083(ASP) | 0.437 | Plastic | 1.530 | 55.8 | −1.11 |
| 11 | | 0.88384(ASP) | 0.375 | | | | |
| 12 | IR-filter | Plano | 0.300 | Glass | 1.517 | 64.2 | — |
| 13 | | Plano | 0.323 | | | | |
| 14 | Image | Plano | — | | | | |

Note:
The reference wavelength is d-line 587.6 nm

The content of Table 7-3 may be deduced from Table 7-2.

TABLE 7-3

The Seventh Embodiment

| f (mm) | 2.97 | $R_{10}/f$ | 0.30 |
|---|---|---|---|
| Fno | 2.80 | $CT_3/CT_4$ | 0.41 |
| HFOV (deg.) | 33.1 | $|f/f_4| + |f/f_5|$ | 5.19 |
| $v_1 - v_3$ | 34.4 | SL/TTL | 0.84 |
| $v_1 - (v_2 + v_3)$ | 13.0 | Td (mm) | 2.78 |
| $|R_1/R_2|$ | 0.10 | $(\Sigma CT)/Td$ | 0.81 |

FIG. 7B is a schematic view of longitudinal spherical aberration curves when the lights having a wavelength of 486.1 nm, 587.6 nm, and 656.3 nm are respectively projected in the optical imaging system in FIG. 7A. It can be known from FIG. 7B that, when the different wavelengths, 486.1 nm, 587.6 nm, and 656.3 nm, of the light received by the optical imaging system 70 of this embodiment, the longitudinal spherical aberrations generated by the optical imaging system 70 are within a range of –0.005 mm to 0.025 mm.

FIG. 7C is a schematic view of astigmatic field curves when the light having the wavelength of 587.6 nm is projected in the optical imaging system in FIG. 7A. It can be known from FIG. 7C that, the astigmatic field curvature of the tangential plane generated when the light having the wavelength of 587.6 nm is projected in the optical imaging system 70 is within a range of 0.00 mm to 0.05 mm, and the astigmatic field curvature of the sagittal plane is within a range of 0.00 mm to 0.01 mm.

FIG. 7D is a schematic view of a distortion curve when the light having the wavelength of 587.6 nm is projected in the optical imaging system in FIG. 7A. It can be known from FIG. 7D that, the distortion ratio generated when the light having the wavelength of 587.6 nm is projected in the optical imaging system 70 is within a range of –0.1% to 1.5%. As shown in FIGS. 7B to 7D, the optical imaging system 70, designed according to the seventh embodiment, is capable of effectively eliminate correcting aberrations.

The Eighth Embodiment (Embodiment 8)

Figure 8A:
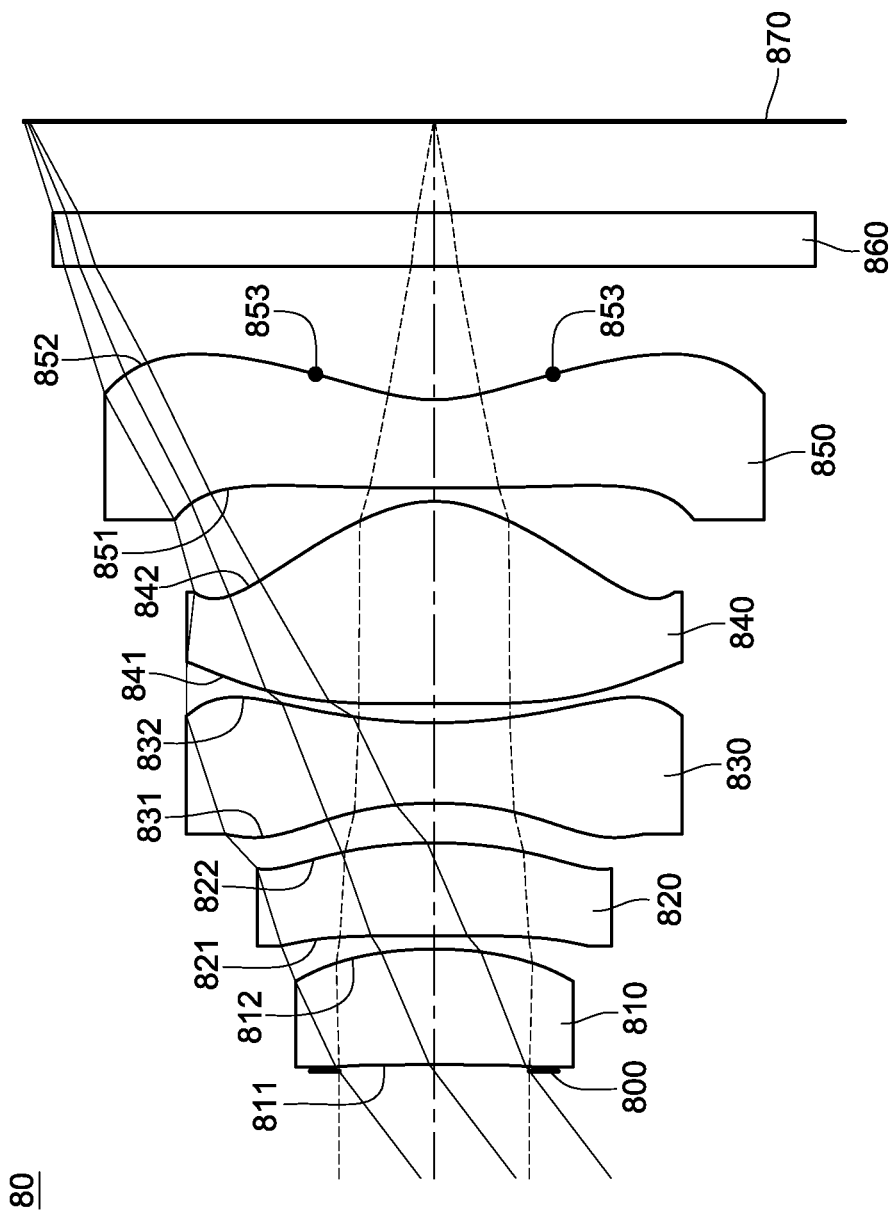
FIG. 8A is a schematic structural view of an eighth embodiment of the optical imaging system according to the present invention.

FIG. 8A is a schematic structural view of an eighth embodiment of the optical imaging system according to the present invention. The specific implementation and elements of the seventh embodiment are substantially the same as that in the first embodiment, wherein the element symbols all begin with "8", which correspond to those in the first embodiment with the same function or structure. For conciseness, only the differences are illustrated below, and the similarities will not be repeated herein.

In this embodiment, for example, the wavelength of the light received by the optical imaging system 80 is 587.6 nm, but the wavelength may be adjusted according to actual requirements, and is not limited to the wavelength value mentioned above.

Furthermore, the fourth lens element 840 and the fifth lens element 850 are aspheric lens elements, and the aspheric surfaces may satisfy Condition ASP, but are not limited thereto. As for the parameters of the aspheric surfaces, reference is made to Table 8-1 below.

TABLE 8-1

Aspheric Coefficients

| | Surface# | | | | |
|---|---|---|---|---|---|
| | 2 | 3 | 4 | 5 | 6 |
| k | −5.00000E+01 | −5.43568E+00 | −1.00000E+00 | −1.09957E+01 | 5.26336E−01 |
| $A_4$ | −1.88174E−01 | −4.01755E−01 | −1.80866E−01 | −3.76555E−01 | −3.76611E−01 |
| $A_6$ | −7.72897E−01 | −5.25703E−01 | −7.37080E−01 | 3.42803E−01 | 8.82750E−01 |
| $A_8$ | 2.67101E+00 | 1.65696E−01 | −7.82042E−01 | 3.57655E−01 | 3.06576E+00 |
| $A_{10}$ | −1.04494E+01 | 1.02413E−01 | 5.01774E+00 | 1.87038E+00 | −5.57196E+00 |
| $A_{12}$ | 2.48533E−01 | 1.76600E−01 | 1.50346E+00 | 4.29108E−01 | 2.30611E+00 |
| $A_{14}$ | −7.37461E−01 | 7.09083E−02 | −7.15455E−01 | −2.03420E−01 | — |

| | Surface# | | | | |
|---|---|---|---|---|---|
| | 7 | 8 | 9 | 10 | 11 |
| k | −1.00000E+00 | −1.00000E+00 | −3.43882E+00 | −5.00000E+01 | −8.13010E+00 |
| $A_4$ | −1.11461E−01 | 4.43858E−01 | −4.24231E−01 | 2.19350E−01 | −2.30964E−01 |
| $A_6$ | 1.02131E−01 | −1.24581E−01 | 7.72565E−01 | −8.52536E−01 | 2.01741E−01 |
| $A_8$ | −5.25530E−02 | −5.52957E−01 | −3.73577E−01 | 1.08824E+00 | −1.26552E−01 |
| $A_{10}$ | −7.06329E−01 | 4.54413E−01 | 6.28603E−02 | −5.38700E−01 | 2.19035E−03 |
| $A_{12}$ | 4.50781E−01 | 3.65501E−01 | 4.35662E−01 | −2.85034E−01 | 1.64353E−02 |
| $A_{14}$ | — | −4.17649E−01 | −1.50033E−01 | 1.89609E−01 | −4.55860E−03 |

In this embodiment, the first lens element 810 has a positive refractive power, the third lens element 830 has a negative refractive power, the fourth lens element 840 has a positive refractive power, and the fifth lens element 850 has a negative refractive power. The image-side surface 832 of the third lens element 830 is a concave surface, the image-side surface 842 of the fourth lens element 840 is a convex surface, and the image-side surface 852 of the fifth lens element 850 is a concave surface.

Two points of inflection 853 are on the image-side surface 852 of the fifth lens element 850. As a result, the angle at which light is projected onto the electronic sensor (not shown) of the image plane 870 from the off-axis field can be effectively reduced; thereby the aberration in the off-axis field of view is further corrected.

The detailed data of the optical imaging system 80 is as shown in Table 8-2 below.

TABLE 8-2

Embodiment 8
f = 2.00 mm, Fno = 2.80, HFOV = 37.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.025 | | | | |
| 2 | Lens 1 | −16.94920(ASP) | 0.432 | Plastic | 1.544 | 55.9 | 2.84 |
| 3 | | −1.42930(ASP) | 0.050 | | | | |
| 4 | Lens 2 | −44.27610(ASP) | 0.347 | Plastic | 1.632 | 23.4 | 2.89 |
| 5 | | −1.76031(ASP) | 0.149 | | | | |
| 6 | Lens 3 | −1.41534(ASP) | 0.300 | Plastic | 1.632 | 23.4 | −1.26 |
| 7 | | 1.96073(ASP) | 0.071 | | | | |
| 8 | Lens 4 | −74.92590(ASP) | 0.757 | Plastic | 1.544 | 55.9 | 0.84 |
| 9 | | −0.45515(ASP) | 0.050 | | | | |
| 10 | Lens 5 | 30.00000(ASP) | 0.330 | Plastic | 1.530 | 55.8 | −1.13 |
| 11 | | 0.58537(ASP) | 0.500 | | | | |
| 12 | IR-filter | Plano | 0.200 | Glass | 1.517 | 64.2 | — |
| 13 | | Plano | 0.341 | | | | |
| 14 | Image | Plano | — | | | | |

Note:
The reference wavelength is d-line 587.6 nm

The content of Table 8-3 may be deduced from Table 8-2.

TABLE 8-3

The Eighth Embodiment

| f (mm) | 2.00 | $R_{10}/f$ | 0.29 |
|---|---|---|---|
| Fno | 2.80 | $CT_3/CT_4$ | 0.40 |
| HFOV (deg.) | 37.3 | $|f/f_4| + |f/f_5|$ | 4.15 |
| $v_1 - v_3$ | 32.5 | SL/TTL | 1.01 |
| $v_1 - (v_2 + v_3)$ | 9.1 | Td (mm) | 2.49 |
| $|R_1/R_2|$ | 11.86 | $(\Sigma CT)/Td$ | 0.87 |

FIG. 8B is a schematic view of longitudinal spherical aberration curves when the lights having a wavelength of 486.1 nm, 587.6 nm, and 656.3 nm are respectively projected in the optical imaging system in FIG. 8A. It can be known from FIG. 8B that, when the different wavelengths, 486.1 nm, 587.6 nm, and 656.3 nm, of the light are received by the optical imaging system 80 of this embodiment, the longitudinal spherical aberrations generated by the optical imaging system 80 are within a range of −0.02 mm to 0.02 mm.

FIG. 8C is a schematic view of astigmatic field curves when the light having the wavelength of 587.6 nm is projected in the optical imaging system in FIG. 8A. It can be known from FIG. 8C that, the astigmatic field curvature of the tangential plane generated when the light having the wavelength of 587.6 nm is projected in the optical imaging system 80 is within a range of −0.005 mm to 0.06 mm, and the astigmatic field curvature of the sagittal plane is within a range of −0.025 mm to 0.01 mm.

FIG. 8D is a schematic view of a distortion curve when the light having the wavelength of 587.6 nm is projected in the optical imaging system in FIG. 8A. It can be known from FIG. 8D that, the distortion ratio generated when the light having the wavelength of 587.6 nm is projected in the optical imaging system 80 is within a range of −0.8% to 0.3%. As shown in FIGS. 8B to 8D, the optical imaging system 80, designed according to the eighth embodiment, is capable of effectively correcting various aberrations.

What is claimed is:

1. An optical imaging system comprising five lens elements, the five lens elements being, in order from an object side to an image side:

a first lens element;
a second lens element having positive refractive power;
a third lens element having negative refractive power;
a fourth lens element with positive refractive power having an object-side surface being concave in a paraxial region thereof and an image-side surface being convex in a paraxial region thereof; and
a fifth lens element with negative refractive power having an object-side surface being convex in a paraxial region thereof and an image-side surface being concave in a paraxial region thereof, wherein at least one of the object-side surface and the image-side surface of the fifth lens element is aspheric, and the image-side surface of the fifth lens element has at least one inflection point;
wherein a central thickness of the first lens element is larger than an axial distance between the third lens element and the fourth lens element, an Abbe number of the first lens element is V1, an Abbe number of the third lens element is V3, a radius of curvature of the image-side surface of the fifth lens element is R10, a focal length of the optical imaging system is f, and the following conditions are satisfied:

$29 < V1 - V3 < 45$; and $0.1 < R10/f < 0.5$.

2. The optical imaging system according to claim 1, further comprises an aperture stop disposed between an imaged object and the third lens element, wherein an axial distance from the aperture stop to an image plane is SL, an axial distance from an object-side surface of the first lens element to the image plane is TTL, and the following condition is satisfied:

$0.65 < SL/TTL < 1.10$.

3. The optical imaging system according to claim 1, wherein a sum of central thicknesses of the first lens element, the second lens element, the third lens element, the fourth lens element and the fifth lens element is $\Sigma CT$, an axial distance from an object-side surface of the first lens element to the image-side surface of the fifth lens element is Td, and the following condition is satisfied:

$0.77 < \Sigma CT/Td < 0.95$.

4. The optical imaging system according to claim 1, wherein the radius of curvature of the image-side surface of the fifth lens element is R10, the focal length of the optical imaging system is f, and the following condition is satisfied:

$0.1 < R10/f \leq 0.29$.

5. The optical imaging system according to claim 1, wherein an axial distance from an object-side surface of the first lens element to the image-side surface of the fifth lens element is Td, and the following condition is satisfied:

2.00 millimeters (mm)<Td<3.00 mm.

6. The optical imaging system according to claim 1, wherein an axial distance between the second lens element and the third lens element is larger than an axial distance between the fourth lens element and the fifth lens element.

7. The optical imaging system according to claim 1, wherein a central thickness of the fourth lens element is larger than the axial distance between the third lens element and the fourth lens element.

8. The optical imaging system according to claim 1, wherein an absolute value of a focal length of the third lens element is larger than an absolute value of a focal length of the fifth lens element.

9. The optical imaging system according to claim 1, wherein an absolute value of a focal length of the third lens element is larger than an absolute value of a focal length of the fourth lens element.

10. The optical imaging system according to claim 1, wherein an air gap is formed on an optical axis between every two lens elements adjacent to each other among the first lens element, the second lens element, the third lens element, the fourth lens element and the fifth lens element.

11. An optical imaging system comprising five lens elements, the five lens elements being, in order from an object side to an image side:
   a first lens element;
   a second lens element having positive refractive power;
   a third lens element having negative refractive power;
   a fourth lens element with positive refractive power having an object-side surface being concave in a paraxial region thereof and an image-side surface being convex in a paraxial region thereof; and
   a fifth lens element with negative refractive power having an image-side surface being concave in a paraxial region thereof, wherein at least one of an object-side surface and the image-side surface of the fifth lens element is aspheric, and the image-side surface of the fifth lens element has at least one inflection point;
   wherein an absolute value of a radius of curvature of an object-side surface of the first lens element is larger than an absolute value of a radius of curvature of an image-side surface of the first lens element, an absolute value of a focal length of the third lens element is larger than an absolute value of a focal length of the fourth lens element; an Abbe number of the first lens element is V1, an Abbe number of the third lens element is V3, a sum of central thicknesses of the first lens element, the second lens element, the third lens element, the fourth lens element and the fifth lens element is ΣCT, an axial distance from an object-side surface of the first lens element to the image-side surface of the fifth lens element is Td, and the following conditions are satisfied:

29<V1−V3<45; and 0.77<ΣCT/Td<0.95.

12. The optical imaging system according to claim 11, wherein the third lens element has an image-side surface being concave in a paraxial region thereof.

13. The optical imaging system according to claim 11, wherein the image-side surface of the first lens element is convex in a paraxial region thereof, and an air gap is formed on an optical axis between every two lens elements adjacent to each other among the first lens element, the second lens element, the third lens element, the fourth lens element and the fifth lens element.

14. The optical imaging system according to claim 11, wherein a central thickness of the third lens element is CT3, a central thickness of the fourth lens element is CT4, and the following condition is satisfied:

0.40≤CT3/CT4<0.55.

15. The optical imaging system according to claim 11, wherein a central thickness of the first lens element is larger than an axial distance between the third lens element and the fourth lens element.

16. The optical imaging system according to claim 11, further comprising an aperture stop disposed between the first lens element and the second lens element.

17. An optical imaging system comprising five lens elements, the five lens elements being, in order from an object side to an image side:
   a first lens element;
   a second lens element having positive refractive power;
   a third lens element having negative refractive power;
   a fourth lens element with positive refractive power having an object-side surface being concave in a paraxial region thereof and an image-side surface being convex in a paraxial region thereof; and
   a fifth lens element with negative refractive power having an image-side surface being concave in a paraxial region thereof, wherein at least one of an object-side surface and the image-side surface of the fifth lens element is aspheric, and the image-side surface of the fifth lens element has at least one inflection point;
   wherein an absolute value of a radius of curvature of an object-side surface of the first lens element is larger than an absolute value of a radius of curvature of an image-side surface of the first lens element; an Abbe number of the first lens element is V1, an Abbe number of the third lens element is V3, a focal length of the optical imaging system is f, a focal length of the fourth lens element is f4, a focal length of the fifth lens element is f5, and the following conditions are satisfied:

29<V1−V3<45; and 3.8<|f/f4|+|f/f5|<5.7.

18. The optical imaging system according to claim 17, wherein the image-side surface of the first lens element is convex in a paraxial region thereof.

19. The optical imaging system according to claim 17, wherein a sum of central thicknesses of the first lens element, the second lens element, the third lens element, the fourth lens element and the fifth lens element is ΣCT, an axial distance from the object-side surface of the first lens element to the image-side surface of the fifth lens element is Td, and the following condition is satisfied:

0.77<ΣCT/Td<0.95.

20. The optical imaging system according to claim 17, wherein an axial distance between the second lens element and the third lens element is larger than an axial distance between the fourth lens element and the fifth lens element.

21. An optical imaging system comprising five lens elements, the five lens elements being, in order from an object side to an image side:
   a first lens element;
   a second lens element having positive refractive power;
   a third lens element with negative refractive power having an image-side surface being concave in a paraxial region thereof;

a fourth lens element with positive refractive power having an object-side surface being concave in a paraxial region thereof and an image-side surface being convex in a paraxial region thereof; and a fifth lens element with negative refractive power having an image-side surface being concave in a paraxial region thereof, wherein at least one of an object-side surface and the image-side surface of the fifth lens element is aspheric, and the image-side surface of the fifth lens element has at least one inflection point;

wherein an absolute value of a radius of curvature of an object-side surface of the first lens element is larger than an absolute value of a radius of curvature of an image-side surface of the first lens element; a radius of curvature of the image-side surface of the fifth lens element is R10, a focal length of the optical imaging system is f, and the following condition is satisfied:

$0.1 < R10/f < 0.5$.

22. The optical imaging system according to claim 21, wherein the radius of curvature of the image-side surface of the fifth lens element is R10, the focal length of the optical imaging system is f, and the following condition is satisfied:

$0.1 < R10/f \leq 0.29$.

23. The optical imaging system according to claim 21, wherein a sum of central thicknesses of the first lens element, the second lens element, the third lens element, the fourth lens element and the fifth lens element is ΣCT, an axial distance from the object-side surface of the first lens element to the image-side surface of the fifth lens element is Td, and the following condition is satisfied:

$0.77 < \Sigma CT/Td < 0.95$.

24. The optical imaging system according to claim 21, further comprising an aperture stop disposed between the first lens element and the second lens element.

25. The optical imaging system according to claim 21, wherein the object-side surface of the fifth lens element is convex in a paraxial region thereof.

26. The optical imaging system according to claim 21, wherein an absolute value of a focal length of the third lens element is larger than an absolute value of a focal length of the fifth lens element.

27. The optical imaging system according to claim 21, wherein an axial distance between the second lens element and the third lens element is larger than an axial distance between the fourth lens element and the fifth lens element.

28. The optical imaging system according to claim 21, wherein an axial distance between the third lens element and the fourth lens element is larger than an axial distance between the first lens element and the second lens element.

29. The optical imaging system according to claim 21, wherein an air gap is formed on an optical axis between every two lens elements adjacent to each other among the first lens element, the second lens element, the third lens element, the fourth lens element and the fifth lens element.

* * * * *

Disclaimer

10,209,487 B2 - Chun-Shan Chen; Tsung-Han Tsai; Hsin-Hsuan Huang, all of Taichung (TW). OPTICAL IMAGING SYSTEM. Patent dated February 19, 2019. Disclaimer filed June 20, 2023, by the assignee, Largan Precision Co., LTD.

I hereby disclaim the following complete claims 1-2, 6-10, of said patent.

*(Official Gazette, August 22, 2023)*